US012611628B2

(12) United States Patent
Brouillette et al.

(10) Patent No.: US 12,611,628 B2
(45) Date of Patent: Apr. 28, 2026

(54) SYSTEM AND METHOD FOR CONTINUOUS GAS ADSORBATE CAPTURE USING ADSORPTION/REGENERATION CYCLE

(71) Applicant: SOCPRA SCIENCES ET GENIE S.E.C., Sherbrooke (CA)

(72) Inventors: Martin Brouillette, Sherbrooke (CA); Gabriel Vezina, Sherbrooke (CA); Alexandre Camire, Sherbrooke (CA)

(73) Assignee: SOCPRA SCIENCES ET GENIE S.E.C., Sherbrooke (CA)

( * ) Notice: Subject to any disclaimer, the term of this patent is extended or adjusted under 35 U.S.C. 154(b) by 659 days.

(21) Appl. No.: 18/002,758

(22) PCT Filed: Jun. 25, 2021

(86) PCT No.: PCT/CA2021/050879
§ 371 (c)(1),
(2) Date: Dec. 21, 2022

(87) PCT Pub. No.: WO2021/258219
PCT Pub. Date: Dec. 30, 2021

(65) Prior Publication Data
US 2023/0241546 A1 Aug. 3, 2023

Related U.S. Application Data

(60) Provisional application No. 63/044,371, filed on Jun. 26, 2020.

(51) Int. Cl.
B01D 53/02 (2006.01)
B01D 53/08 (2006.01)
(Continued)

(52) U.S. Cl.
CPC ............. B01D 53/08 (2013.01); B01D 53/62 (2013.01); B01D 53/83 (2013.01);
(Continued)

(58) Field of Classification Search
CPC ........ B01D 2253/102; B01D 2253/108; B01D 2253/202; B01D 2253/204;
(Continued)

(56) References Cited

U.S. PATENT DOCUMENTS 4,701,189 A * 10/1987 Oliker .................... B01D 53/06
95/123
7,947,118 B2 5/2011 Rarig et al.
(Continued)

FOREIGN PATENT DOCUMENTS

JP 11169646 6/1999
WO 2015103401 A1 7/2015
(Continued)

OTHER PUBLICATIONS

Arab et al., Methanol synthesis from CO2 and H2 in multi-tubular fixed-bed reactor and multi-tubular reactor filled with monoliths, Chemical Engineering Research and Design 92:11 (2014) 2598-2608.
(Continued)

*Primary Examiner* — Christopher P Jones
(74) *Attorney, Agent, or Firm* — NORTON ROSE FULBRIGHT CANADA LLP

(57) ABSTRACT

A system for gas adsorbate capture has an adsorption reactor(s) configured for receiving an adsorbate gas flow. A regeneration reactor(s) is configured for receiving a regenerative fluid flow. A plurality of individual sorbent cells are in a generally continuous cycle between the adsorption reactor and the regeneration reactor. A group of the individual sorbent cells may form an adsorption moving bed in the adsorption reactor to capture the adsorbate from the gas flow.

22 Claims, 13 Drawing Sheets

(51) Int. Cl.

| | |
|---|---|
| *B01D 53/62* | (2006.01) |
| *B01D 53/83* | (2006.01) |
| *B01J 20/34* | (2006.01) |

(52) U.S. Cl.
CPC ....... *B01J 20/3483* (2013.01); *B01D 2253/34* (2013.01); *B01D 2257/504* (2013.01); *B01D 2258/0283* (2013.01); *B01D 2258/06* (2013.01); *B01D 2259/4009* (2013.01)

(58) Field of Classification Search
CPC .......... B01D 2253/206; B01D 2253/34; B01D 2257/504; B01D 2258/0283; B01D 2258/06; B01D 2259/4009; B01D 53/0446; B01D 53/0462; B01D 53/08; B01D 53/62; B01D 53/82; B01D 53/83; B01D 53/96; B01J 20/3483; Y02C 20/40
See application file for complete search history.

(56) References Cited

U.S. PATENT DOCUMENTS

| | | | |
|---|---|---|---|
| 2003/0015093 A1* | 1/2003 | Wegeng .................... C01B 3/56<br>95/114 |
| 2009/0249954 A1 | 10/2009 | Gadkaree et al. |
| 2011/0296872 A1 | 12/2011 | Eisenberger |
| 2015/0007725 A1* | 1/2015 | Elliott .................... B01D 53/83<br>96/125 |
| 2015/0010452 A1 | 1/2015 | Elliott et al. |
| 2023/0023050 A1* | 1/2023 | Eisenberger ........... B01D 53/02 |

FOREIGN PATENT DOCUMENTS

| | | |
|---|---|---|
| WO | 2017165974 | 10/2017 |
| WO | 2020011156 A1 | 1/2020 |

OTHER PUBLICATIONS

De Witt et al., Critical Comparison of Structured Contactors for Adsorption-Based Gas Separations, Annu Rev Chem Biomol Eng. Jun. 7, 2018;9:129-152.

Fasihi et al., Techno-economic assessment of CO2 direct air capture plants, Journal of Cleaner Production, 224 (2019) 957-980.

Hansen et al., Young people's burden: requirement of negative CO2 emissions, Jul. 2017, Earth System Dynamics, 8(3):577-616.

Jung et al., Moving bed adsorption process based on a PEI-silica sorbent for CO2 capture, International Journal of Greenhouse Gas Control, 67 (2017) 10-19.

Kim et al., Continuous testing of silica-PEI adsorbents in a lab.-scale twin bubbling fluidized-bed system, International Journal of Greenhouse Gas Control, 82 (2019) 184-191.

Lee et al., Potential flue gas impurities in carbon dioxide streams separated from coal-fired power plants, J Air Waste Manag Assoc. 2009;59(6):725-732.

Schwieger et al., Hierarchy concepts: classification and preparation strategies for zeolite containing materials with hierarchical porosity, Chem Soc Rev. Jun. 13, 2016;45(12):3353-76.

Sinha et al., Systems Design and Economic Analysis of Direct Air Capture of CO2 through Temperature Vacuum Swing Adsorption Using MIL-101(Cr)-PEI-800 and mmen-Mg2(dobpdc) MOF Adsorbents, Industrial & Engineering Chemistry Research, 2016, 56(3).

Wilcox, Jennifer, Carbon Capture, Springer Science+Business Media, LLC 2012.

* cited by examiner

100

100

(a)

(a)                                    (b)

SYSTEM AND METHOD FOR CONTINUOUS GAS ADSORBATE CAPTURE USING ADSORPTION/REGENERATION CYCLE

CROSS-REFERENCE TO RELATED APPLICATION

The present application claims the benefit of U.S. Patent Application No. 63/044,371, filed on Jun. 26, 2020, and incorporated herein by reference.

TECHNICAL FIELD

The disclosure relates to a capture process for gas adsorbates (gas phase adsorbates), such as $CO_2$, by adsorption and desorption and to associated equipment.

BACKGROUND

Gas adsorbate capture processes, primarily used for capture of $CO_2$ by adsorption, use an adsorbent material that has the capability to fix adsorbate molecules to its surface. For example, in the case of $CO_2$, a cyclic adsorption process requires at least two steps; an adsorption step where $CO_2$ is attached to the adsorbent material, and a desorption step, also known as a regeneration step, where $CO_2$ is released from the adsorbent material. An adsorption process is a surface phenomenon. It is therefore advantageous to use materials with a very large specific surface area (i.e., the ratio of the actual surface area of an object to the volume of the object) such as porous materials. FIG. 1A schematically shows a cyclic adsorption $CO_2$ capture system with regeneration method. During adsorption, the gas to be treated must be brought into contact with the surface of the adsorbent material. This is associated with a mechanical energy cost ($W_{tan}$) to move the gas flow to be treated. During the adsorption phase, chemical bonds of varying intensity (e.g. Van der Waals interactions) are created between the $CO_2$ molecules and the adsorbent material. The chemical links are generally created without requiring external energy. The adsorption process may generally occur naturally when the adsorbate is in contact with the adsorbent material. During regeneration (i.e., desorption), the captured $CO_2$ is released by breaking the chemical bonds that bind the $CO_2$ molecules to the adsorbent material. The desorption phase is associated with an energy cost called desorption energy ($Q_{des}$). To release the captured $CO_2$, the adsorbent material is exposed to a temperature and/or pressure modulation, or to other occurrences such as a condensable vapor injection (such as steam), which changes the adsorption capacity of the material (i.e., amount of adsorbed compounds per unit mass of adsorbent).

For an industrial $CO_2$ capture system, the volume of gas to be processed is substantial. For example, for a typical 500 MW coal-fired power plant ($CO_2$ concentration of $12\%_{vol}$), the mass flow of $CO_2$ released is for example about 50'000 kg/h and the gas flow rate to be treated is about 2'500'000 $m^3$/h. As another example, for a device for capturing $CO_2$ directly from the atmospheric air ($CO_2$ concentration of 410 ppm), to capture one metric ton of $CO_2$ per hour, with a capture percentage of 50%, the air flow rate to be treated is about 2'600'000 $m^3$/h. For these $CO_2$ capture applications, the pressure drop is an element to be minimized in order to reduce the associated energy demand required to ensure the treatment of the flow of gas.

The fluid pressure drop is directly related to the flow velocity. For an optimized system, it may desirable to increase the flow velocity, even if it increases the pressure drop. In the case of a $CO_2$ capture system, the cost of the sorbent material may be substantially higher than the cost of the energy required to provide the flow. Thus, having higher pressure drops may be acceptable if it reduces the amount of adsorption material needed.

SUMMARY

In a first aspect, there is provided a system for gas adsorbate capture comprising at least one adsorption reactor configured for receiving an adsorbate gas flow; at least one regeneration reactor configured for receiving a regenerative fluid flow; and a plurality of individual sorbent cells in a generally continuous cycle between the adsorption reactor and the regeneration reactor; wherein a group of the individual sorbent cells form an adsorption moving bed in the adsorption reactor to capture the adsorbate from the gas flow.

Still further in accordance with the first aspect, for example, the individual sorbent cells move between the adsorption reactor and the regeneration reactor in a first-in-first-out order.

Still further in accordance with the first aspect, for example, a first heat-exchanger zone is between the adsorption reactor and the regeneration reactor for the sorbent cells moving from the adsorption reactor to the regeneration reactor to be heated.

Still further in accordance with the first aspect, for example, a second heat-exchanger zone is between the regeneration reactor and the adsorption reactor for the sorbent cells moving from the regeneration reactor to the adsorption reactor to be cooled.

Still further in accordance with the first aspect, for example, the first heat-exchanger zone and the second heat-exchanger zone are in fluid communication with one another, the first heat-exchanger zone being downstream of the second heat-exchanger zone.

Still further in accordance with the first aspect, for example, at least one heat-exchanger system is between the first heat-exchanger zone and the second heat-exchanger zone to heat a fluid flowing through the first heat-exchanger zone and the second heat-exchanger zone.

Still further in accordance with the first aspect, for example, an outlet of the adsorption reactor is in fluid communication with the second heat-exchanger zone for fluid to flow from the adsorption reactor to the second heat-exchanger zone.

Still further in accordance with the first aspect, for example, the adsorbate gas flow in the adsorption reactor is a countercurrent flow.

Still further in accordance with the first aspect, for example, the regenerative gas flow in the regeneration reactor is a countercurrent flow.

Still further in accordance with the first aspect, for example, linear actuators displace the sorbent cells in the generally continuous cycle.

Still further in accordance with the first aspect, for example, a liquid reservoir is in the regeneration reactor and is configured to receive at least one of the sorbent cells to heat same prior to an exposure to the regenerative fluid flow.

Still further in accordance with the first aspect, for example, an airlock is provided at an inlet and/or an outlet of the regeneration reactor.

Still further in accordance with the first aspect, for example, an airlock is provided at an inlet and/or an outlet of the adsorption reactor.

Still further in accordance with the first aspect, for example, the sorbent cells are moved in pods between the adsorption reactor and the regeneration reactor, the pods having doors to isolate the sorbent cells from an environment.

Still further in accordance with the first aspect, for example, the system is enclosed in an ISO container.

Still further in accordance with the first aspect, for example, the adsorbate gas flow is transverse to a length of the ISO container.

Still further in accordance with the first aspect, for example, the regenerative fluid flow is transverse to a length of the ISO container and is in a direction opposite to the adsorbate gas flow.

Still further in accordance with the first aspect, for example, the cells move in a direction generally parallel to a length of the ISO container when moving between the adsorption reactor and the regeneration reactor.

Still further in accordance with the first aspect, for example, the ISO container includes a 3×2 matrix of the adsorption reactor, and a 1×2 matrix of the regeneration reactor.

Still further in accordance with the first aspect, for example, the regeneration reactors of the 1×2 matrix share a common regenerative fluid outlet.

Still further in accordance with the first aspect, for example, the adsorption reactor is open to an environment for the adsorbate gas flow to be ambient air.

Still further in accordance with the first aspect, for example, the sorbent cells have square faces with internal channels extending between the square faces.

Still further in accordance with the first aspect, for example, the sorbent cells have internal channels extending between ends, a surface of the internal channels having adsorption capacity.

Still further in accordance with the first aspect, for example, the internal channels are straight.

Still further in accordance with the first aspect, for example, the internal channels are parallel to one another.

Still further in accordance with the first aspect, for example, the internal channels are in fluid communication through porous sorbent material between the channels.

Still further in accordance with the first aspect, for example, sets of the internal channels include first internal channels open at an inlet and closed at an outlet, second internal channels closed at an inlet and open at an outlet.

Still further in accordance with the first aspect, for example, at least one of the sorbent cells is a single element.

Still further in accordance with the first aspect, for example, at least one of the sorbent cells has a plurality of sub-sorbent cells interconnected to one another by at least one flexible connecting member.

Still further in accordance with the first aspect, for example, at least one of sorbent cells has a plurality of sub-sorbent cells held by a holder.

Still further in accordance with the first aspect, for example, at least one of the sorbent cells is deformable in shear or in compression.

Still further in accordance with the first aspect, for example, another group of the individual sorbent cells forms a desorption moving bed in the regeneration reactor to release the adsorbate to the regenerative fluid flow In accordance with a second aspect, there is provided a method for gas adsorbate capture comprising: continuously displacing sorbent cells between at least one adsorption reactor and at least one regeneration reactor in at least one moving bed in the at least one adsorption reactor, exposing a group of the individual sorbent cells in the adsorption reactor to an adsorbate gas flow for the individual sorbent cells of the group to capture the adsorbate, and exposing another group of the individual sorbent cells in the regeneration reactor to a regenerative fluid flow for the individual sorbent cells of the other group to release the adsorbate.

Still further in accordance with the second aspect, for example, continuously displacing sorbent cells between at least one adsorption reactor and at least one regeneration reactor in moving beds includes generally continuously displacing sorbent cells in first-in-first-out order.

Still further in accordance with the second aspect, for example, the method may include heating the sorbent cells in a first heat-exchanger zone when the sorbent cells are displaced from the adsorption reactor to the regeneration reactor.

Still further in accordance with the second aspect, for example, the method may include cooling the sorbent cells in a second heat-exchanger zone when the sorbent cells are displaced from the regeneration reactor to the adsorption reactor.

Still further in accordance with the second aspect, for example, the method may include circulating a heat-exchange fluid from the second heat-exchanger zone to the first heat-exchanger zone.

Still further in accordance with the second aspect, for example, the method may include heating the heat-exchange fluid between the second heat-exchanger zone and the first heat-exchanger zone.

Still further in accordance with the second aspect, for example, the method may include directing the adsorbate gas flow from an outlet of the adsorption reactor to the second heat-exchanger zone.

Still further in accordance with the second aspect, for example, exposing the group of the individual sorbent cells in the adsorption reactor to the adsorbate gas flow includes exposing the group of the individual sorbent cells to a countercurrent flow.

Still further in accordance with the second aspect, for example, exposing the other group of the individual sorbent cells in the regeneration reactor to the regenerative fluid flow includes exposing the other group of the individual sorbent cells to a countercurrent flow.

Still further in accordance with the second aspect, for example, the method may include immersing at least one sorbent cell in the regeneration reactor in a reservoir of a heating liquid.

Still further in accordance with the second aspect, for example, generally continuously displacing the sorbent cells includes displacing the sorbent cells in pods isolating the sorbent cells from an environment outside of the adsorption reactor and of the regeneration reactor.

Still further in accordance with the second aspect, for example, continuously displacing the sorbent cells between the adsorption reactor and the regeneration reactor includes displacing the sorbent cells in a moving bed in the regeneration reactor.

In accordance with a third aspect, there is provided a system for gas adsorbate capture comprising a processing unit; and a non-transitory computer-readable memory communicatively coupled to the processing unit and comprising computer-readable program instructions executable by the processing unit for continuously displacing sorbent cells between at least one adsorption reactor and at least one regeneration reactor in moving beds, inducing an adsorbate gas flow in the adsorption reactor to expose a group of the individual sorbent cells for the individual sorbent cells of the group to capture the adsorbate, and inducing a regenerative fluid flow in the regeneration reactor to expose another group of the individual sorbent cells for the individual sorbent cells of the other group to release the adsorbate.

In accordance with a fourth aspect, there is provided a system for gas adsorbate capture comprising at least one adsorption reactor configured for receiving an adsorbate gas flow; at least one regeneration reactor configured for receiving a regenerative fluid flow; and at least one sorbent cell cycling between the adsorption reactor and the regeneration reactor; wherein the at least one individual sorbent cell move between the adsorption reactor and the regeneration reactor in an automated continuous cycle.

In accordance with a fifth aspect, there is provided a sorbent cell for gas adsorbate capture comprising: a body defining internal channels extending between ends, a surface of the internal channels being made of a sorbent material having adsorption capacity, the body having an outer shape, wherein the outer shape of the body is deformable as a response to a shear force and/or a compression force.

In accordance with a sixth aspect, there is provided a sorbent cell for gas adsorbate capture comprising: at least two subcells, each said subcell including a body defining internal channels extending between ends, a surface of the internal channels being made of a sorbent material having adsorption capacity; and at least one connector between the at least two subcells, for the at least two subcells to be movable relative to one another.

DESCRIPTION OF THE DRAWINGS

Reference is now made to the accompanying figures in which.

DETAILED DESCRIPTION

Figure 1A:
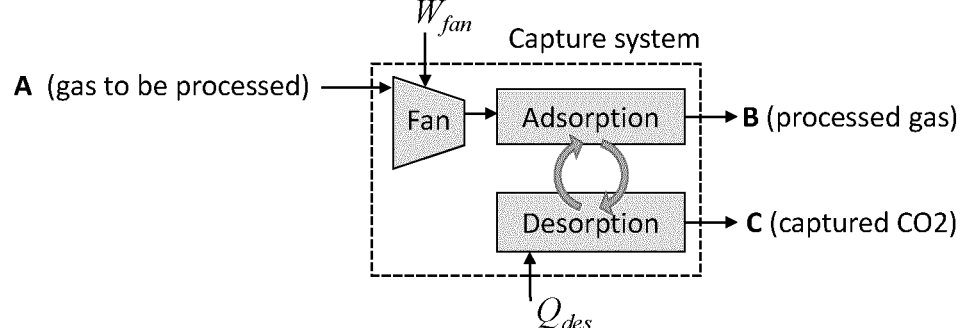
FIG. 1A is a schematic view of a cyclic adsorption $CO_2$ capture process with regeneration method in accordance with the prior art.
Figure 1B:
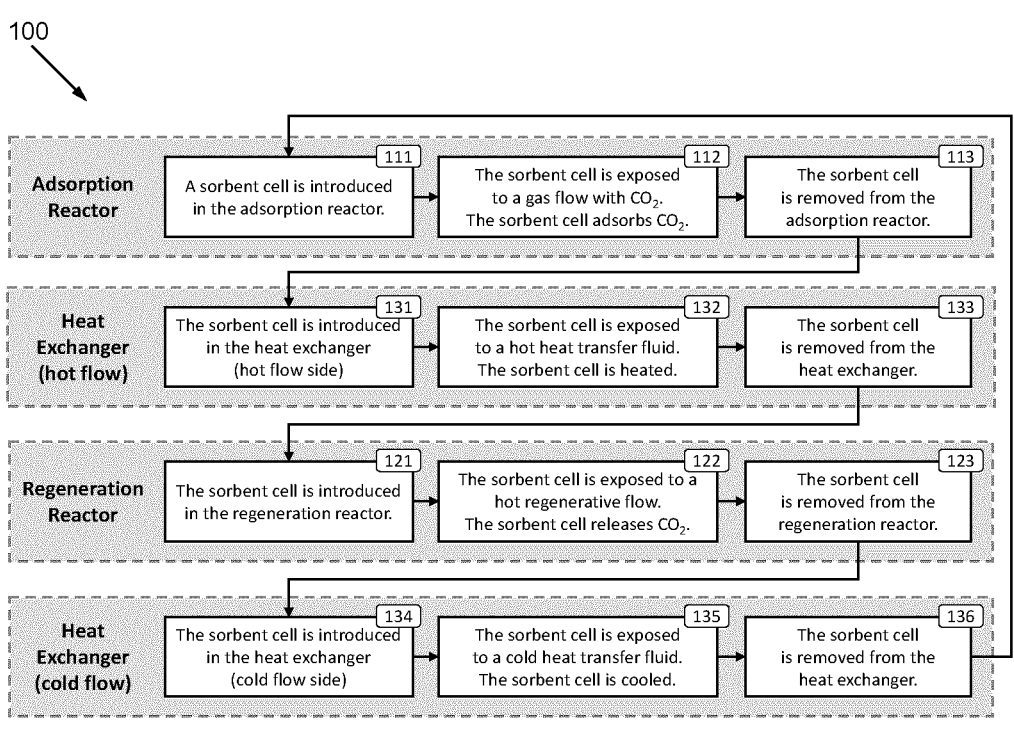
FIG. 1B is a process flow diagram of a method for $CO_2$ capture in accordance with the present disclosure, with a single sorbent cell.
Figure 1C:
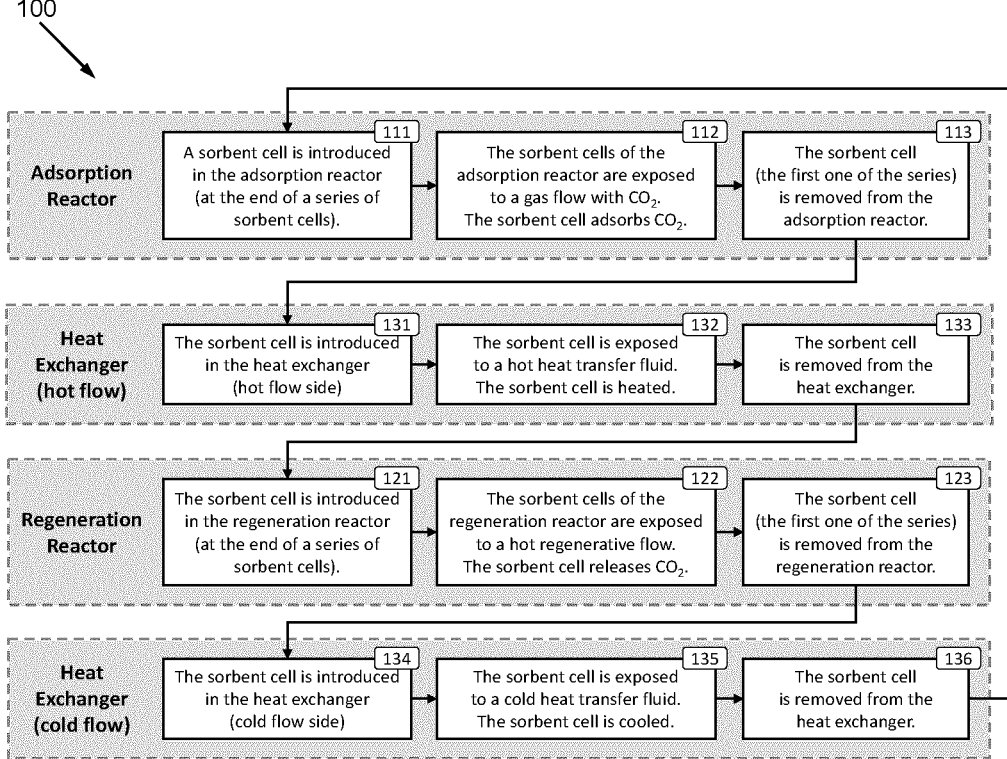
FIG. 1C is a process flow diagram of a method for $CO_2$ capture in accordance with the present disclosure, with a plurality of sorbent cells.

Referring to the drawings and more particularly to FIGS. 1B and 1C, a process flow diagram shows a method 100 for gas adsorbate capture in accordance with the present disclosure. The present disclosure will describe herein the process and system for which the gas adsorbate is $CO_2$. However, the process 100 and related system 200 apply to other gas adsorbates as well, whereby similar principles as taught herein for $CO_2$ apply to other gas adsorbates. The process flow diagram is based on the tracking of a single sorbent cell. The entire process of the present disclosure can operate with a single sorbent cell (FIG. 1B), or with multiple sorbent cells (FIG. 1C). The method 100 is a continuous process, in that a sorbent cell passes continuously through different parts of the process. The expression "sorbent" is used due to the cells' capacity to adsorb and release $CO_2$. Other expressions could be used for the cells, such as adsorption cells, capture cells, blocks, units, etc. For simplicity, the expression sorbent cell will be used consistently through the present disclosure, while encompassing other expressions.

Referring to FIG. 1B, the process illustratively begins at 111 with the insertion of a sorbent cell into the adsorption reactor. Then, at 112, the sorbent cell in the adsorption reactor is exposed to a gas flow containing at least one gas phase adsorbate to be removed. The most common adsorbates (gaseous contaminants) include $CO_2$, $SO_X$, $H_2S$, $NO_X$ and others. For simplicity, we use $CO_2$ as the adsorbate for the rest of the present disclosure. Consequently, the sorbent cell adsorbs $CO_2$ in the adsorption reactor. At 113, the sorbent cell is removed from the adsorption reactor. This completes the segment of the process with a sorption cell in the adsorption reactor.

The process also includes at 131 the insertion of the sorbent cell into the heat exchanger in the hot flow side. Then, at 132, the sorbent cell is exposed to a hot heat transfer fluid. Thus, the sorbent cell is heated. The sorbent cell is then removed from the heat exchanger, at 133. This completes the segment of the process step with a sorption cell in the hot flow side of the heat exchanger.

The process may also include the insertion of the sorbent cell into a regeneration reactor at 121. Then, the sorbent cell in the regenerative reactor is exposed to a hot regenerative flow, as an example, at 122, such that the sorbent cell releases $CO_2$ or another gas phase adsorbate to be removed. Then, at 123, the sorbent cell is removed from the regenerative reactor. This completes the segment of the process with a sorption cell in the regenerative reactor.

The process may also include the insertion of the sorbent cell into the cold flow side of the heat exchanger in at 134. There, the sorbent cell is exposed to a cold heat transfer fluid at 135, such that the sorbent cell is cooled. The sorbent cell is then removed from the heat exchanger, at 136. This completes the segment of the process step in the cold flow side of the heat exchanger. The process is then looped by introducing the sorbent cell in the adsorption reactor, as in 111. The steps of the process may be repeated sequentially as set out above. The method 100 can work properly for a continuous $CO_2$ adsorption/desorption process even if the heat exchanger zone is not present. The heat exchanger zone may increase the performance of the process and method but is optional.

Figure 10:
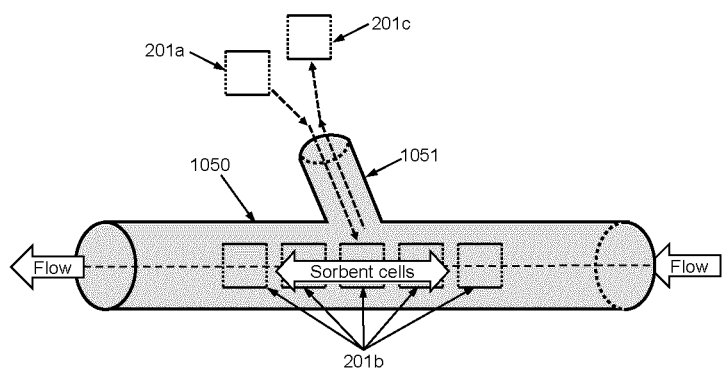
FIG. 10 is a schematic view of an embodiment of a regeneration reactor or an adsorption reactor using the same ports as inlets and outlets ports for sorbent cells.

However, in contrast to the embodiment of FIG. 1B, in operation, a plurality of sorbent cells may be present as in FIG. 10, at various steps of the process, in a continuous operation of the method 100. Stated differently, in contrast to a batch operation, the method 100 is a continuous process, in that sorbent cells are distributed in different parts of the process, with individual progress of the sorbent cells. For simplicity, the process in FIG. 10 is described with the tracking of a single sorbent cell, though a plurality of sorbent cells are present, at various steps of the process. The process illustratively begins at 111 with the insertion of a sorbent cell into the adsorption reactor, at the end of a series of sorbent cells. Then, at 112, the sorbent cells of the adsorption reactor are exposed to a gas flow containing at least one gas phase adsorbate to be removed. Again, for example, $CO_2$ is used as the adsorbate, though other gases may be used. Consequently, the sorbent cells adsorb $CO_2$ in the adsorption reactor. At 113, a sorbent cell, i.e., a first one of the series of sorbent cells in the adsorption reactor, is removed from the adsorption reactor, in a first-in-first-out fashion, as an example. This completes the segment of the process with a sorption cell in the adsorption reactor. Other sequences may also be possible, such that the first cell may not be the one to be removed.

The process also includes at 131 the insertion of a sorbent cell into the heat exchanger in the hot flow side. Then, at 132, the sorbent cell is exposed to a hot heat transfer fluid. Thus, the sorbent cell is heated. The sorbent cell is then removed from the heat exchanger, at 133. This completes the segment of the process step with a sorption cell in the hot flow side of the heat exchanger.

The process may also include the insertion of a sorbent cell into a regeneration reactor at 121, at the end of a series of sorbent cells. Then, all sorbent cells of the regenerative reactor are optionally exposed to a hot regenerative flow at 122, such that the sorbent cells release $CO_2$. Then, at 123, a sorbent cell, i.e., a first one of the series of a regenerative reactor, is removed from the regenerative reactor, again in first-in-first-out fashion, for example. This completes the segment of the process with a sorption cell in the regenerative reactor.

The process may also include the insertion of a sorbent cell into the cold flow side of the heat exchanger in at 134.

There, the sorbent cell is exposed to a cold heat transfer fluid at 135, such that the sorbent cell is cooled. The sorbent cell is then removed from the heat exchanger, at 136. This completes the segment of the process step in the cold flow side of the heat exchanger. The process is then looped by introducing the sorbent cell in the adsorption reactor, as in 111. The steps of the process may be repeated sequentially as set out above. The process may be performed continuously with a plurality of sorbent cells at different parts of the process.

Figure 2A:
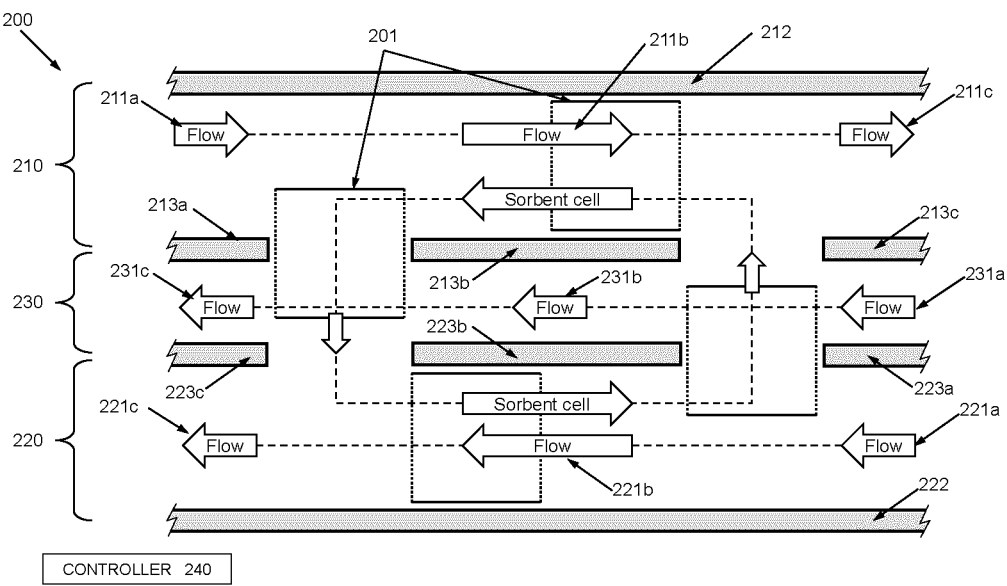
FIG. 2A is a schematic view of a system for $CO_2$ capture in accordance with the present disclosure, with a single sorbent cell.
Figure 2B:
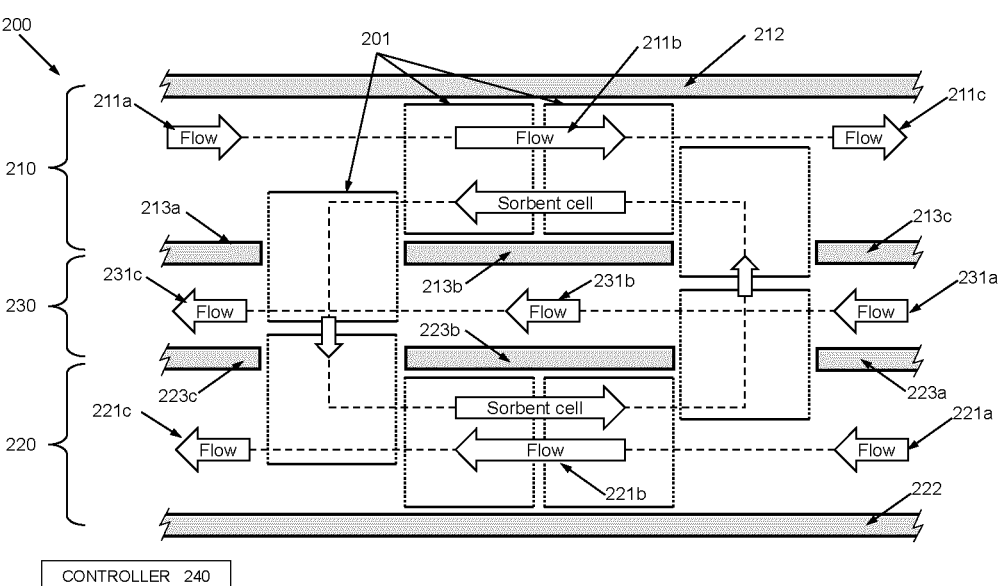
FIG. 2B is a schematic view of a system for $CO_2$ capture in accordance with the present disclosure, with a plurality of sorbent cells.

FIGS. 2A and 2B present a system 200 to perform $CO_2$, or other gas phase adsorbates as mentioned above, capture operations, in accordance with the present disclosure. The system 200 in FIGS. 2A and 2B differs in that in FIG. 2A a single sorbent cell is present, while in FIG. 2B, a plurality of sorbent cells are present. Thus, in the illustrated embodiment of FIG. 2A, a single sorbent cell 201 is shown, in various locations of the system 200, whereas, in the illustrated embodiment of FIG. 2B, there are a number of sorbent cells 201 cycling in the whole adsorption process. In the illustrated embodiment, these are three main zones side-by-side: an adsorption reactor zone 210 (a.k.a., adsorption reactor), a regeneration reactor zone 220 (a.k.a., a regeneration or desorption reactor), and a heat exchanger zone 230 therebetween. There may be a plurality of any one of the zones, with more zones than others, etc. A controller 240 may be used to operate the various components of the system 200.

For simplicity, reference is now made to FIG. 2B, with a plurality of sorbent cells. In the adsorption reactor zone 210, a few sorbent cells 201 in series move in an upstream direction relative to a gas flow 211 charged with $CO_2$ (shown as 211a-211c, such that the gas flow 211 passes through the sorbent cells 201. The zone 210 is shown as having a single conduit or duct. The flow 211a entering the adsorption zone 210 is the flow to be treated by the adsorption process. This stream can come from atmospheric air ($CO_2$ concentration approximately 400 ppm), industrial process flue gases ($CO_2$ concentration up to 50%), thermal power plant flue gases ($CO_2$ concentration from 5% to 25%), as examples among others. The sorbent cells 201 exposed to the gas stream 211 to be treated adsorb a portion of the $CO_2$, and this reduces the concentration of $CO_2$ in the stream 211. Stream 211c leaving the adsorption zone 210 contains less $CO_2$ than it does at its entrance 211a.

The sorbent cells 201 that adsorbed $CO_2$ are regenerated in the regeneration reactor zone 220, i.e., the cells 201 are desorbed from their adsorbed $CO_2$. In an embodiment, the sorbent cells 201 are directed into the regeneration reactor zone 210 when they are close to their saturation condition of $CO_2$. The sorbent cells 201 leave the adsorption reactor 210, for example through a side port, e.g., between wall portions 213a and 213b. The sorbent cells 201 may enter the adsorption reactor 210 through another side port, such as between wall portions 213b and 213c. The walls 212 and 213 of the adsorption reactor are preferably thermally insulated to reduce exposure of the adsorption reactor 220 to heat from the surrounding environment, and vice versa.

In the regeneration reactor zone 220, sorbent cells 201 in series move downstream relative to a regenerative stream 221 (shown as 221a-221c), which regenerative stream 221 passes through the sorbent cells 201. The regenerative stream 221 can be, for example, a low temperature saturated steam (e.g., from 80° C. to 150° C.). The sorbent cells 201 highly loaded in $CO_2$ are exposed to the regenerative stream 221, and may consequently release $CO_2$ in the stream 221. This increases $CO_2$ concentration in the stream 221. Stream 221c leaving the regeneration zone contains a higher $CO_2$ concentration than it does at its entrance 221a.

The sorbent cells 201 enter in the regeneration reactor 220, for example through a side port, e.g., between wall portions 223b and 223c and the sorbent cells leave the regeneration reactor through another side port, i.e., between wall portions 223a and 223b. The walls (i.e., 222, and 223) of the regeneration reactor 220 are preferably thermally insulated to reduce exposure of the regeneration reactor 220 to heat from the surrounding environment and vice versa.

The sorbent cells 201 moving from the adsorption reactor zone 210 to the regeneration reactor zone 220 and vice versa may pass through the heat exchanger zone 230. Indeed, the sorbent cells 201 in the adsorption reactor 210 may optionally be at a relative low temperature (e.g., less than 40° C.) to maximize their capacity to adsorb $CO_2$. In an example, the sorbent cells 201 in the regenerator reactor 220 may be at a higher temperature (e.g., above 80° C.) to maximize their ability to release their captured $CO_2$. In the embodiment of FIG. 2, the heat exchange zone 230 is used to transfer heat from hot sorbent cells 201, i.e., sorbent cells 201 moving from the regeneration reactor 220 to the adsorption reactor 210, to the cold sorbent cells 201, i.e., sorbent cells 201 moving from the adsorption reactor 210 to the regeneration reactor 220. A flow 231 of heat-transfer fluid (shown as 231a-231c from cold to hot) first passes through the hot sorbent cells 201, which are cooled while the heat-transfer fluid is heated. The heated heat transfer fluid shown at 231b subsequently passes through the cold sorbent cells 201, which are then heated while the heat transfer fluid is cooled. The heat-transfer fluid may be a gas or a liquid, such as air or water, for example.

Figure 3:
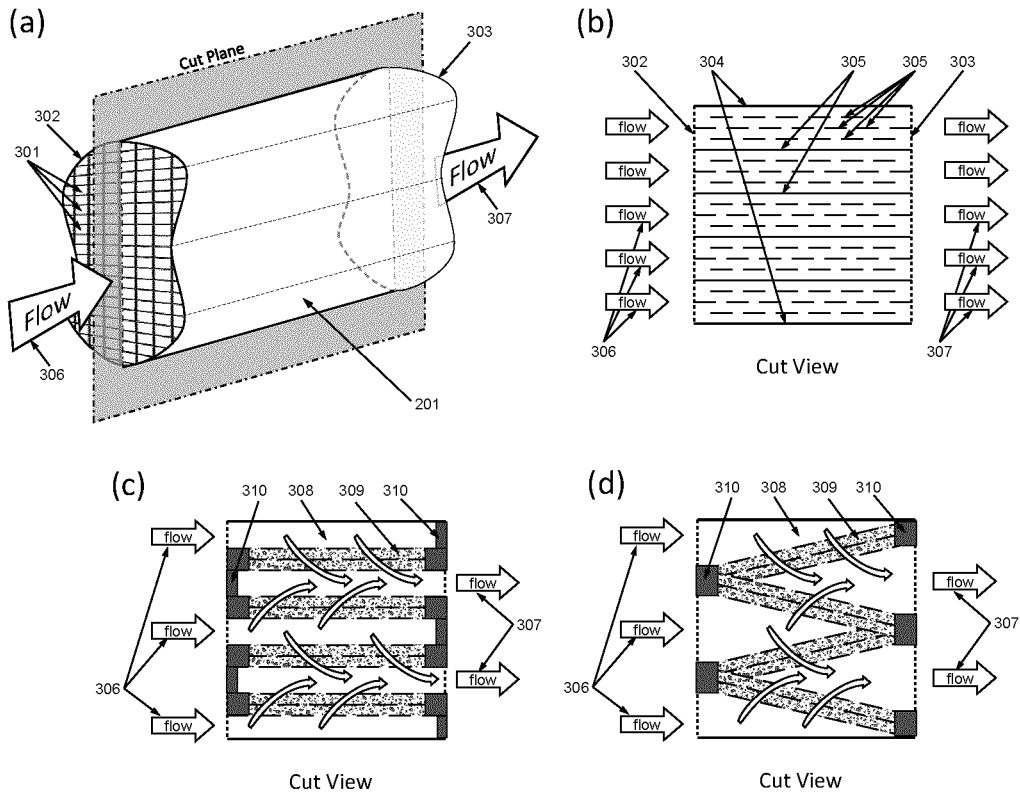
FIG. 3 is a schematic view of an exemplary sorbent cell of the system of FIG. 2A or 2B.

Referring now to FIG. 3, the sorbent cells 201 are illustrated in greater detail to illustrate their characteristics and main boundaries. FIG. 3 also shows a cutaway view, in b) of the sorbent cell 201 to illustrate its internal construction. In an embodiment, the sorbent cell 201 is mainly a prismatic shape, such as cylindrical among numerous other contemplated shapes. The sorbent cell 201 may have a plurality of internal channels 301 allowing a mostly axial flow through them. The prismatic shape of sorbent cells can be but not limited to round, elliptical, oval, oblong, square, rectangular, triangular, pentagonal, hexagonal section, among many others. Both ends 302 and 303 of the sorbent cell 201 are highly permeable boundaries to allow flow with minimal resistance. The side wall(s) 304 may be impermeable to block sideways flow and prevent crossflow. The impermeable sidewall(s) 304 allow the main flows 211, 221, 231 of the process zones to essentially remain in their respective zones, i.e., adsorption reactor 210, regenerator reactor 220 and heat exchanger 230.

The internal channels 301 of the sorbent cells 201 may be straight channels. The channels 301 may take various cross-sectional shapes, which includes, but are not limited to round, square, triangular, hexagonal, half wave, parallel plates, among numerous others. It is not necessary for all channels 301 to be the same size or shape. The internal surfaces 305 of the channels can be impermeable or permeable. The internal surfaces 305 may consist of porous materials with high specific surface area (i.e., surface area of a material per unit of bulk volume). The internal structure of the sorbent cell is not limited to straight channel (e.g., honeycomb channels geometry), but may also include internal structure, which includes, packing of particles, open-cell solid foam, periodic open cellular structure, non-woven fabric, among numerous others. The porous material must have a high capacity for physisorption and/or chemisorption of $CO_2$. The porous material should also have a higher $CO_2$ adsorption selectivity compared to other chemical species (e.g. $N_2$, $H_2O$, $O_2$). For physisorption adsorption, some of the materials that may be used include activated carbon, activated alumina, silica gel, zeolites (i.e., aluminosilicate minerals), metal-organic frameworks (MOF), and many others. For chemisorption material, amine-based materials, lithium-based materials and calcium-based materials may be used, including amine-impregnated and amine-grafted material. Amine-based materials that may be used include at least the following: monoethanolamine (MEA), diethanolamine (DEA), diethylenetriamine (DETA), polyethylenimine (PEI), triethanolamine (TEA) and tetraethylenepentamine (TEPA). The sorbent material can also include ion-exchange resin. Depending on the mechanical properties of the adsorbent material, the sorbent cell 201 may require a substrate core to support the adsorbent material. This substrate core be made of various materials including at least the following: metal, ceramic, plastic and fiber. The sorbent cells 201 may be individual integral units or can be a combination of sub sorbent cells 201.

Still referring to FIG. 3, subfigures c) and d) show additional cutaway views of the sorbent cell to illustrate other possible internal geometries. In an embodiment of the sorbent cell 201, the incoming flow 306 may pass into an internal channel 308, then pass through the sorbent material 309, then pass into another internal channel 308, up to the outflow flow 307. The flow may be blocked by blocking elements 310 at the end of inflow internal channels 308 of the sorbent cell. These blocking elements 310 ensure that the internal flow passes through the absorbent material 309. This type of internal flow pattern ensures that internal flow passes through the sorbent material instead of only passing over the surface of the sorbent. As shown in d), the internal elements of the sorbent cell 201 are not limited to being parallel (as in subfigure c)) and may be oriented in non-parallel geometries. This arrangement may provide for better flow control (e.g., flow uniformity) within the internal channels 308. The absorbent material 309 does not need to be formed into a straight shape, or does not require a constant thickness.

During the entire cycling process in the system 200 shown in FIG. 2B, the sorbent cells 201 may maintain a constant orientation, i.e., they keep the same faces oriented to the right and to the left in the example of FIGS. 2A and 2B, but stated differently they move only in X,Y,Z relative to a X,Y,Z coordination system, no substantial angular variation. This may entail that the flow orientation relative to the sorbent cell 201 is inverted from the adsorption reactor 210 as compared with the regeneration reactor 220 and with the heat exchanger flow 230. For the adsorption reactor zone 210, with reference to FIG. 3, the flow 306 enters the cell 201 and exits at 307. For the regeneration reactor zone 220 and the heat exchanger zone 230, the flow is inverted.

By way of example, the frontal area ($A_{cell}$) of a sorbent cell 201 may be sized for an axial gas flow velocity ($V_{gas}$) between 0.1 and 100 m/s, preferably between 1 m/s to 10 m/s. The frontal area ($A_{cell}$) of the sorbent cells may be from 1 $mm^2$ to 100 $m^2$, preferably between 1 $cm^2$ and 25 $m^2$. As an example, for a volumetric flow rate ($Q_{gas}$) of 1 $m^3$/s, the frontal area ($A_{cell}$) of the sorbent cells should be within the range of 0.1 $m^2$ to 1 $m^2$; ($Q_{gas}=A_{cell} \times V_{gas}$). For square cross-section sorbent cells, these frontal areas represent a side length ($a_{cell}$) of 1 mm for 1 $mm^2$, 1 cm for 1 $cm^2$, 5 m for 25 $m^2$ and 10 m for 100 $m^2$; ($A_{cell}=a_{cell} \times a_{cell}$). For a specific application, the characteristic side dimension, (i.e. hydraulic diameter of the main flow in each zone) of the frontal area of the absorbent cells may vary from the millimeter scale to the tens of meter scale. Beyond these dimensions, it would be practically simpler to duplicate the system and use a plurality of systems 200 for the same facility. The total length ($L_{adsorption}$) of the adsorption reactor depends on many parameters, including the percentage of $CO_2$ captured, flow characteristics, sorption cell geometry, and process cycle parameters. For example, the total length of the adsorption reactor may be from 10 cm to 50 m depending on the process parameter, preferably from 1 m to 10 m. The length ($L_{cell}$) of the sorbent cells depends on the number ($n_{cell,ads}$) of sorbent cells in the adsorption reactor, but should vary from 1 to 10 cells; the length of each sorbent cell may vary from 1 cm to 5 m. The internal channels of the sorbent cells 201 should have a hydraulic diameter in the millimeter/centimeter scale, from 0.1 mm to 10 cm. In the case in which the sorbent cells 201 are cylindrical, that may be rolled to move between zones.

Figure 4:
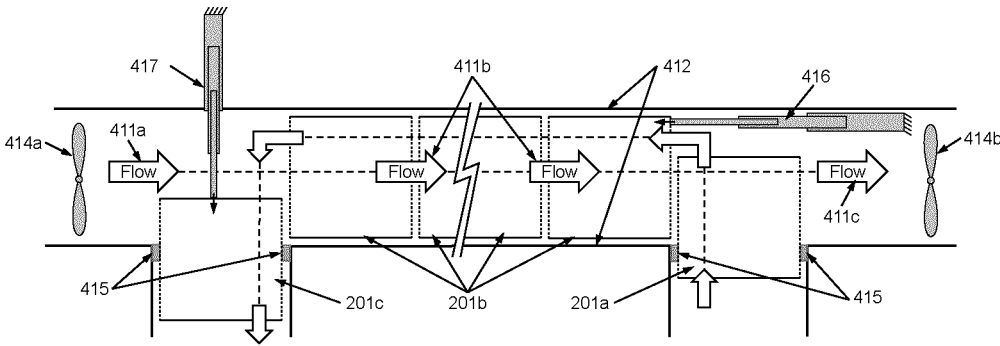
FIG. 4 is a schematic view of an adsorption reactor zone of the system of FIG. 2B, illustrating a displacement pattern of sorbent cells relative to a direction of flow.

Referring now to FIG. 4, an embodiment of the adsorption reactor 210 of the system 200 is shown in greater detail. In FIG. 4, the sorbent cells 201 in the adsorption reactor 210 are used in a mainly continuous countercurrent adsorption moving bed but using sorbent cells 201 instead of solid sorbent particles. The sorbent cells 201 in the adsorption reactor 210 are in series of two or more. The sorbent cells 201 in series allow a control of the adsorption breakthrough curve of the adsorption reactor 210. An upstream-most one of the sorbent cells is shown as 201c, and is the most loaded with $CO_2$ and is then removed from the series of sorbent cells 201 in order to be regenerated in the regeneration reactor 220. The sorbent cells 201b in the middle of the adsorption reactor 210 are in a mass transfer zone (MTZ), where most of the mass transfer takes place, i.e., the sorbent cells 201 adsorb $CO_2$. The downstream-most sorbent cell 201a is freshly regenerated and is introduced in the adsorption reactor 210 at the end of the series of sorbent cells 201 to allow a continuous adsorption process.

The gas flow 411 in the adsorption reactor 210 can be driven by one or more fans 414 placed upstream (e.g., 414a) and/or downstream (e.g., 414b). Alternatives to fans include compressors, blowers or any other dynamic or positive displacement compressor. The axial movement of the sorbent cells 201 in the adsorption reactor 210 may be driven by a linear actuator 416, such as an air cylinder, electric actuator, electric motor with rotation to translation transmission. In an embodiment, a cross-section of the conduit of the reactor 210 is such that the flow stream is forced through the cells 201 instead of surrounding the cells 201. The cells 201 are shown as advancing in a single file, but other arrangements are considered, include multi-file displacement. Alternatively or additionally, a conveyor system may be used to cause the axial movement of the sorbent cells 201. For example, the linear actuator 416 may move each cell individually like with a pleated belt conveyor. Otherwise, the sorbent cells 201 can concurrently form a rigid link and move together by pushing the next one, with the downstream-most of the sorbent cells 201 being pushed by the linear actuator 416. The linear actuator 416 must be strong enough to overcome drag force induced by the flow 411 through the sorbent cells 201.

The upstream-most sorbent cell 201c is removed from the adsorption reactor 210 through a side port. This may occur when the cell 201c is saturated with $CO_2$, or close to a saturation level. In an embodiment, the sorbent cell 201c may then be pushed by another linear actuator, such as the one shown at 417, or by other similar device as described above.

The sorbent cells that enter or exit the adsorption reactor 210, i.e., sorbent cells 201a and 201c, respectively, through side ports, may pass through the sealing device(s) 415. The sealing device(s) 415 are used to keep the flow 411 within the adsorption reactor 210 and reduce leakage. The sealing device 415 can be as an example a brush seal, a lip seal, flaps forming a check valve.

In an exemplary embodiment of FIG. 4, the regeneration reactor 220 can be filled with a liquid. In that case, the regenerative flow 521 is a liquid, instead of a gas or a vapour (a.k.a., vapor). The reactor 220 may be partially or totally filled with liquid, such as water as an example. The sorbent cells 201 are then partially or totally immersed in the regenerative liquid. The desorption process in liquid may allow a better heat transfer in comparison to a gas used as regeneration fluid. The liquid in the desorption reactor 220 can be well suited for a regeneration process using CSD, TCSD, VSD, PSD, TVSD, for example. Collecting the $CO_2$ at the exit flow 521c of the regenerator fluid may be facilitated because the regeneration fluid is already a liquid, and the recovered $CO_2$ is mainly in the gas phase.

Figure 5A:
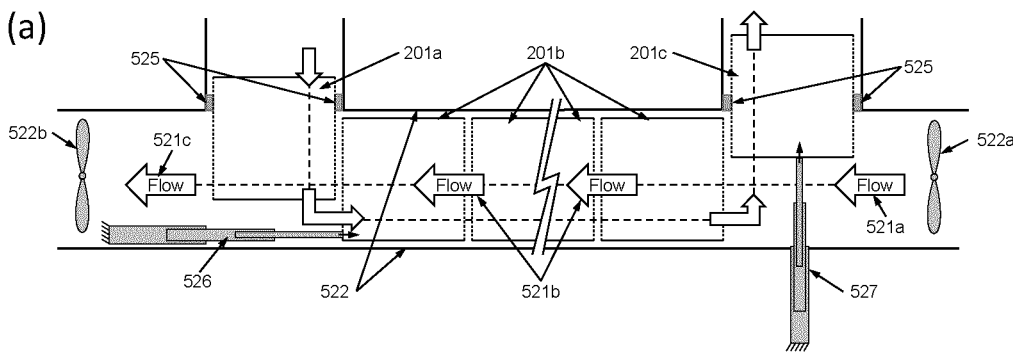
FIG. 5A is a schematic view of a regeneration reactor zone of the system of FIG. 2B, illustrating a displacement pattern of sorbent cells relative to a direction of flow.

Referring to FIG. 5A, an exemplary embodiment of the regeneration reactor 220 is shown. The regeneration reactor 220 works in similar fashion as does the adsorption reactor 210 in terms of inducing a displacement of the cells 201, though with the flow being in an opposite direction, for desorption instead of adsorption. As expressed above, in the regeneration reactor 220, the sorbent cells 201 release their $CO_2$ load into a regeneration fluid. The desorption process may include, for example, the following: temperature swing desorption (TSD), concentration swing desorption (CSD), temperature concentration swing desorption (TCSD), vacuum swing desorption (VSD), pressure swing desorption (PSD), temperature vacuum swing desorption (TVSD), steam stripping and steam-assisted temperature vacuum swing desorption (S-TVSD) or the use of any condensable vapor. For TSD, the sorbent of the sorbent cells 201 is purged only by changing the temperature. For CSD, the sorbent of the sorbent cells 201 is purged with an inert gas or liquid to desorb $CO_2$. For TCSD, the sorbent of the sorbent cells 201 is heated or cooled (e.g., in the heat exchanger 230 and/or by exposure to hot inert gas) and purged with an inert gas or liquid to desorb $CO_2$. For VSD, the desorption is achieved by applying a vacuum on the sorbent of the sorbent cells 201. For PSD, the desorption is achieved by applying a reduced pressure (lower than the adsorption pressure) on the sorbent of the sorbent cells 201. This reduced pressure is not necessarily a vacuum condition, only a lower pressure than the adsorption pressure. For TVSD, the desorption is achieved by heating or cooling the sorbent of the sorbent cells 201 simultaneously with an assisted vacuum. Steam stripping is a TCSD process using steam instead of an inert gas. The S-TVSD desorption is a hybrid approach in which, in addition to applying a vacuum and heating the sorbent, a steam purge is used to sweep the desorbed $CO_2$. For MSD, the desorption is achieved by applying a different moisture condition on the sorbent of the sorbent cells 201. The regenerative flow 521 (shown as 521a-521c) is then associated with the chosen desorption process. As an example, for a steam-stripping desorption process, regenerative stream 521 can be relatively low temperature saturated water steam (e.g., from 80° C. to 150° C.). For the steam-stripping desorption process, the vapour used can be obtained from water, but can also be but is not limited to alcohol fluid (including the primary alcohol like n-propyl alcohol, secondary alcohol like isopropyl alcohol, tertiary alcohol like the tert-amyl alcohol), hydrocarbon (including as examples hexane and benzene), or many other organic compounds or inorganic compounds. The vapour can be also obtained from a mixture of those presented compounds. This flow is used to heat the sorbent cells 201 and change their surrounding conditions, such as pressure, temperature, humidity, or exposure to condensable vapour, to reduce the $CO_2$ adsorption capacity of the sorbent material to equilibrium. The sorbent cells 201 may then release at least part of their $CO_2$ charge into the regeneration fluid, which transports the $CO_2$ at the outlet of the regeneration reactor 220, via flow 521c. Subsequently, a stream-stripping desorption, namely the process of separating the $CO_2$ from the regeneration stream 521, may be performed in another apparatus which is separate from the regeneration reactor 220. This separation process can involve a heat exchanger to condensate the water, or other, vapour and collect a high purity $CO_2$ gas.

Still referring to FIG. 5A, the sorbent cells 201 in the regeneration reactor 220 are used as a mainly continuous countercurrent moving bed for adsorption, though this is optional. The sorbent cells 201 in the regeneration reactor 220 are in series of two or more. The sorbent cells in series allow a control of the desorption breakthrough curve of the regeneration reactor 220. The upstream-most sorbent cell 201c is freshly unloaded of its $CO_2$ (i.e., the cell 201c may remain charged with a certain amount of $CO_2$, but may be close to the equilibrium of its regeneration state, lower than the adsorption equilibrium capacity) and is then removed from the series of sorbent cells 201 in the regeneration reactor 220 in order to be used again for the adsorption reactor 210. The sorbent cells 201b in the middle of the regeneration reactor 220 are in the mass transfer zone (MTZ), where most of the mass transfer takes place, namely the sorbent cells 201 release $CO_2$. The downstream-most sorbent cell 201a is highly charged in $CO_2$ as it exits the adsorption reactor 210, and is introduced at the end of the series of sorbent cells 201 to allow a continuous desorption process.

The gas flow 521 in the regeneration reactor 220 can be driven by one or more fans 522 placed upstream (e.g. 522a) and/or downstream (e.g. 522b) relative to the gas flow 521 and cells 201. Alternatives to fans include a compressor, a blower or any other dynamic or positive displacement compressor. The axial movement of the sorbent cells 201 is driven by a linear actuator 526 such as an air cylinder, electric actuator, electric motor with rotation to translation transmission. Alternatively or additionally, a conveyor system may be used to cause the axial movement of the sorbent cells 201. For example, the linear actuator 526 may move each cell individually like with a pleated belt conveyor. Otherwise, the sorbent cells 201 can concurrently form a rigid link and move together by pushing the next one, with the downstream-most of the sorbent cells 201 being pushed by the linear actuator 526. The linear actuator 526 must be strong enough to overcome drag force induced by the flow 521 through the sorbent cells 201. The upstream-most sorbent cell 201c is removed from the regeneration reactor 220 through a side port. This may occur when the cell 201c is desorbed of $CO_2$, or close to it. In an embodiment, the sorbent cell 201c may then be pushed by another linear actuator, such as the one shown at 527, or by other similar device as described above.

The sorbent cells that enter or exit the regeneration reactor 220, i.e., sorbent cells 201a and 201c, respectively, through side ports, may pass through the sealing device(s) 525. The sealing device(s) 525 are used to keep the flow 521 in the regeneration reactor 220 and reduce leakage. The sealing device 525 can be as an example a brush seal, a lip seal, flaps forming a check valve. The sealing device 525 can also be a door (e.g., sliding door) that permits a better sealing of the regeneration reactor which can involve vacuum process. The regeneration reactor 220 may also be closed at one end and have only an outlet flow (e.g., the regeneration reactor may be closed at the end where the fan 522a is located). For example, for a temperature swing desorption (TSD), a vacuum swing desorption (VSD) or a temperature vacuum swing desorption, the downstream stream 521c may contain only the internal gases of the desorption reactor and the desorbed adsorbate gases.

The regeneration reactor 220 of FIG. 5A can be filled with a liquid. In that case, the regenerative flow 521 is a liquid, instead of a gas or a vapour. The reactor may by partially or totally filled with liquid, such as water as an example. The sorbent cells 201 are then partially or totally immersed in the regenerative liquid. The desorption process in liquid may allow a better heat transfer compared to a gas as regeneration fluid. The liquid is the desorption reactor can be advantageous for a regeneration process using CSD, TCSD, VSD, PSD, TVSD. Collecting the $CO_2$ at the exit flow 521c of the regenerator fluid may then easier because the regeneration fluid is already a liquid, and the $CO_2$ is mainly in the gas phase.

Figure 5B:
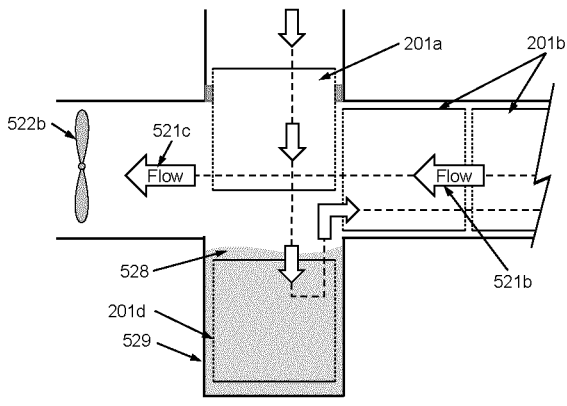
FIG. 5B is a schematic view of a regeneration reactor zone of the system of FIG. 2B, illustrating a liquid reservoir for sorbent cell immersion during the regeneration process.

Referring to FIG. 5B, another embodiment of the regeneration reactor 220 is shown. In FIG. 5B, the sorbent cell 201 entering the regeneration reactor 220 is immersed in a reservoir 529 (a.k.a., basin, pool) filled with a heat-transfer fluid 528. The heat-transfer fluid is used to rapidly heat up the sorbent cell 201d to the temperature of the regenerative process. After the warm-up time in liquid, the sorbent cell 201d is placed in series with the other sorbent cells 201b of the regeneration reactor.

Figure 6:
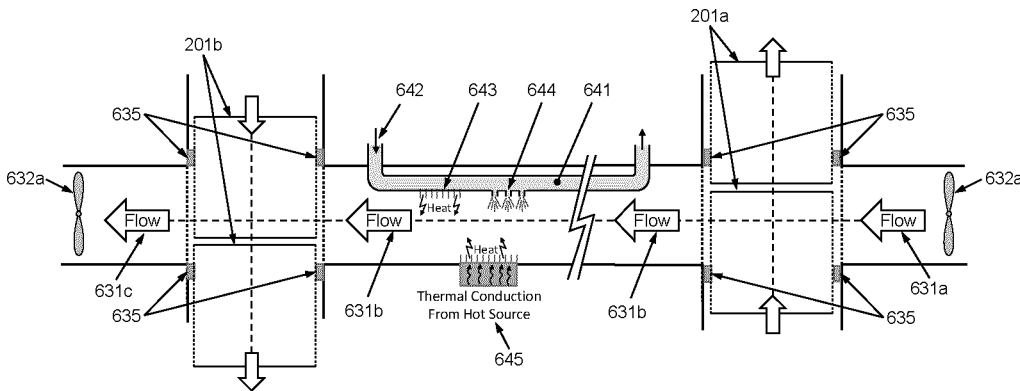
FIG. 6 is a schematic view of a heat exchanger zone of the system of FIG. 2A or 2B, with a displacement pattern of sorbent cells relative to a direction of flow.

Referring now to FIG. 6, an exemplary embodiment of the heat exchanger zone 230 is shown. The heat exchanger zone 230 is used to transfer heat from hot sorbent cells 201a being displaced from the regeneration reactor 220 to the adsorption reactor 210 to other cooler sorbent cells 201b that move in the other direction, i.e., from the adsorption reactor 210 to the regeneration reactor 220. A cold heat transfer fluid 631 (shown as 631a-631c) first passes through the hot sorbent cells 201a, which are then cooled while the heat transfer fluid is heated. The heated heat transfer fluid 631b then passes through the cold sorbent cells 201b, which are then heated while the heat transfer fluid 631 is cooled.

The flow in the heat exchanger zone 230 can also be used to dry the sorbent cells 201, if the regeneration method is steam-stripping. Many sorbent materials (e.g. zeolites, silica gel) are sensitive to water vapour coadsorption, which can reduce the adsorption capacity of $CO_2$ in the adsorption reactor 210. The use of steam stripping regeneration with these sorbent materials may require purging the water from the regenerated sorbent cells 201 before they are used for the adsorption phase. The fluid flow 631 in the heat exchanger zone 230 can be driven by one or more fans 632 placed upstream (e.g. 632b) and/or downstream (e.g. 632a) of the cells 201. Fans can be replaced by a compressor, a blower or any other dynamic or positive displacement compressor. The input flow 631a of the heat exchanger 230 may be partially or wholly derived from the output flow 411c of the adsorption zone 210. A duct (not shown in the figures) may be used to recirculate the flow from the adsorption zone to the heat exchange zone. In this case, the momentum of the flow is partially conserved, which reduces the energy needed to maintain the flow in the heat exchanger. Also, the same fan (e.g., 414a, 414b, 522a, or 522b) may be used to provide energy to the flow in both the adsorption reactor 210 and the heat exchange zone 230.

The sorbent cells 201 that enter or leave the heat exchanger zone 230 (i.e. sorbent cell 201a and 201b) through side ports may pass through sealing device(s) 635. These sealing devices 635 are used to maintain the flow 631 in the heat exchanger zone 230 and reduce leaks and intrusions. The sealing device 635 can be as an example a brush seal, a lip seal, flaps forming a check valve. The sealing device 635 may be shared with or common to the other zones 210 and 220.

In the heat exchanger zone 230, the sorbent cells 201 can concurrently form a rigid link and move together by pushing the next one, with the entering sorbent cells 201 being pushed by the linear actuators 417 or 527, from the other zones. As observed, the sorbent cells 201 move in a direction that is transverse to that of the flow 631. However, the internal channels 301 (FIG. 3) are aligned with the direction of flow 631, for flow through the cells 201. It is contemplated to have additional conveying means to induce a displacement of the cells 201 in the heat exchanger zone 230. Moreover, although the system 200 efficiently recuperates the heat from hot cells 201 to warm up colder cells 201, other heat and/or cooling sources may be used, via distinct zones, instead of the single conduit or duct illustrated in FIGS. 2 and 6.

In an embodiment, an additional heat exchanger system 641 may be used to further warm up the heat transfer fluid 631, at 631b. This additional heating may be carried out on the heat transfer fluid in the central section of duct, i.e., the heat transfer fluid 631 has already absorbed heat from the sorbent cells 201 having exited the regeneration reactor 220. The additional heat exchanger system 641 may use, for example, forced convection using another heat transfer fluid 642. The heat transfer fluid 642 can be heated, for example, by recovering industrial waste heat. The heat transfer fluid 642 may optionally be injected through nozzles 644 into the main flow 631 of the heat exchange zone 230, provided the fluid 642 does not infect the cells 201. By using fluid injection, such as fluid having reclaimed heat from another process, a greater heat transfer is achieved in preheating the sorbent cell 201b to be heated. The injected fluid may be transported by the mainstream 631b and then used to heat the 201b sorbent cell.

As another embodiment, an additional heat exchanger can also be in conductive contact with a wall 645 of the duct of the heat exchange zone 230, to transfer heat to the main flow 631. Surface features such as fins 643 may be present to increase a heat transfer surface. A material with a good thermal conductivity and a finned structure 643 can help increase heat transfer to the mainstream 631. A separate coolant circuit could be used to transfer heat for the two sections of the heat exchange zone 230.

For many adsorption processes (e.g. steam stripping of condensable vapour and steam-assisted temperature vacuum swing desorption), the adsorption phase requires a longer residence time than the regeneration phase. For design system optimization, it may be advantageous to use a configuration integrating several adsorption reactors 210 and regeneration reactors 220. Consequently, the number of adsorption reactors 210 can differ from the number of regeneration reactors 220. Likewise, the adsorption reactors 210 and the regeneration reactors 220 may be of different length and/or may contain a different quantity of sorbent cells 201. In operation, an individual sorbent cell 201 can be used with various adsorption reactors 210 and regeneration reactors 220. For example, the same regeneration reactor 220 could be used to regenerate sorbent cells 201 from various adsorption reactors 210, and vice versa. With a system configuration of several reactors, the residence time of sorbent cells 201 in the adsorption reactor 210 or in the regeneration reactor 220 may be adjusted by a controller unit. The controller 240 (FIG. 2) may be operated to optimize the sorbent cell loading, notably to optimize to reduce sorbent material cost.

Figure 7:
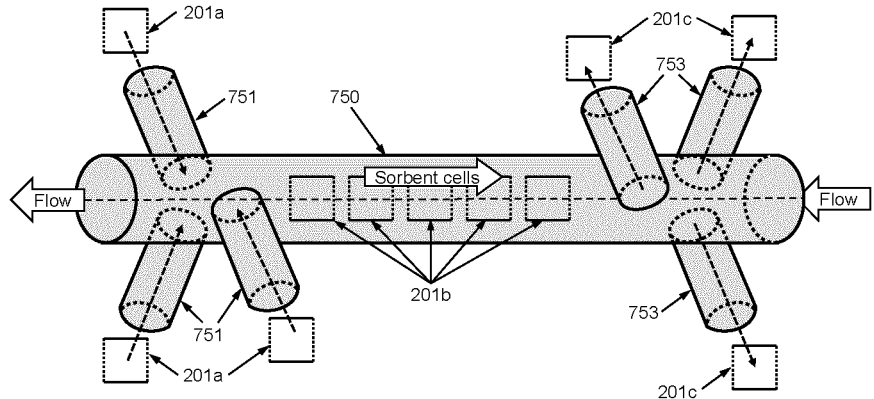
FIG. 7 is a schematic view of an embodiment of a regeneration reactor or an adsorption reactor with a plurality of inlets and outlets ports for sorbent cells.
Figure 8:
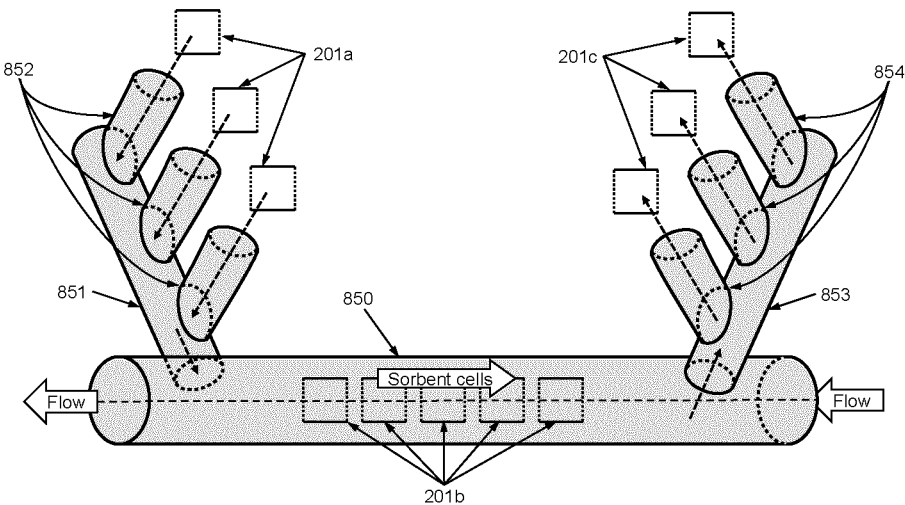
FIG. 8 is a schematic view of an embodiment of a regeneration reactor or an adsorption reactor with a single subdivided input and a single subdivided output for sorbent cells.

For system configurations with several reactors, some reactors can have a plurality of inlets and outlets for sorbent cells. For example, FIG. 7 presents an exemplary reactor 750 (i.e., adsorption or regeneration) with a plurality of inlets 751 and outlet ports 753. FIG. 8 presents another exemplary reactor 850 (i.e. adsorption or regeneration) with multiple inlets 852 combined in a single main inlet 851 and a single main outlet 853 subdivided in multiple outputs 854. A system configuration can be a combination of the embodiments of FIG. 7 and FIG. 8. For simplicity, FIG. 7 and FIG. 8 do not show the mechanisms of manipulation and indexing of the sorbent cells 201 through the inlet and outlet ports.

Figure 9:
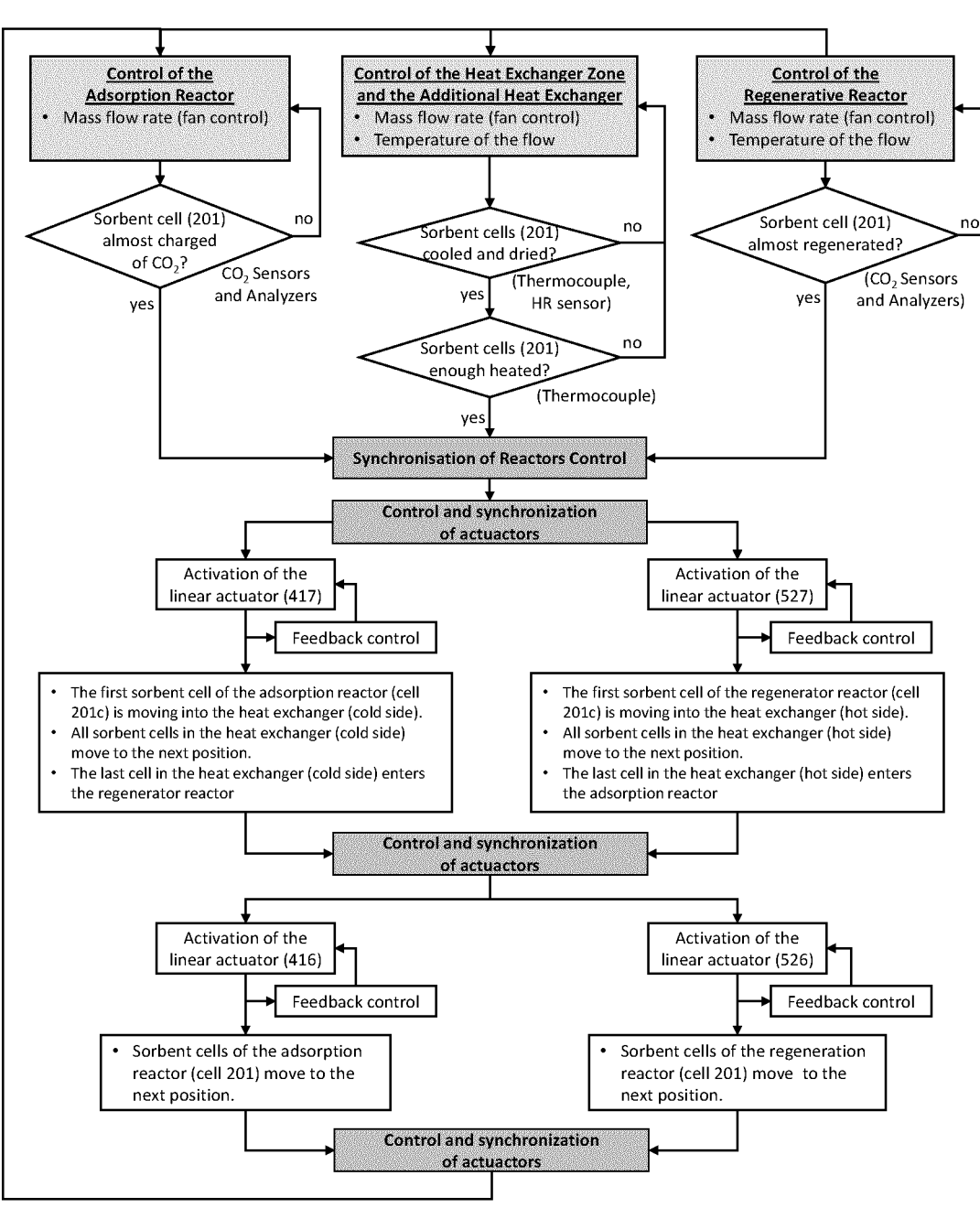
FIG. 9 present a control-flow diagram for an operation of the system for $CO_2$ capture of FIG. 2A or 2B.

Referring to FIG. 9, a control-flow diagram for the operation of the system 200 for $CO_2$ capture is shown, and may include steps that are performed by the controller 240. The controller 240 is of the type including one or more processor units, and a non-transitory computer-readable memory communicatively coupled to the processing unit and comprising computer-readable program instructions executable by the processing unit for operating the various operated components of the system 200, for example in the manner described for method 100 of FIGS. 1B and 10 and/or in the flow diagram of FIG. 9. The three zones (adsorption reactor 210, regeneration reactor 220 and heat exchanger zone 230) may be operated simultaneously with their own feedback loop control with appropriate sensors. The parameters mainly controlled are the mass flow rate and the pressure, such as flows 411, 521 and 631, and the inlet temperature of flows 521 and 631. Each zone is in operation until certain specific conditions are obtained. For the adsorption reactor 210, the specific condition to be obtained may for example be that the upstream sorbent cell 201c (FIG. 4) is almost fully charged with $CO_2$, i.e., adsorption equilibrium condition almost reached. For the regeneration reactor 220, the specific condition to be obtained may be that the upstream-most sorbent cell 201c (FIG. 5) is almost regenerated, i.e., a regeneration equilibrium condition is almost reached. The conditions to be obtained for the heat exchange zone 230 may be that the hot sorbent cells 201a (FIG. 6) have been cooled and dried, and the cold sorbent cells 201b have been preheated. The conditions to be obtained for the heat exchanger zone 230 may be less critical than those of the adsorption reactor 210 and/or the regeneration reactor 220. This is because the capture process can continue to operate even if the heat exchange in the zone 230 is not optimal. When the target conditions are met for each zone, the sorbent cells 201 are cycled. For process optimization, it may be advantageous to have a similar operating time for each zone. This can be done by the controller 240 using the process data from previous cycles. Also to further optimize the process, the controller 240 may adjusts the flow parameters of the adsorption reactor 210 to ensure that the mass transfer zone (MTZ) of the adsorption is approximately the same length as the cumulative length of the sorbent cells 201 in the adsorption reactor 210. This reduces pressure losses and decreases the amount of absorbent material required. Similarly, the controller 240 may adjust the flow parameters of the regeneration reactor 210 to ensure that the desorption mass transfer zone (MTZ) is approximately the same length as the cumulative length of the sorbent cells 201 in the regeneration reactor 220.

For sorbent cell circulation, the controller 240 operates the linear actuators 416, 417, 526 and 527 to move all sorbent cells 201 to the next position and the process can therefore be continuous. Each zone can continue to operate while the linear actuators move the sorbent cells 201. The controller 240 can control the order of actuator activation based on the number of empty spaces for sorbent cells 201 in the cycling process. For example, the movement strategy with an empty space for sorbent cells 201 can be first 416, then 417, then 526, then 527, then restart the cycle. For example, the movement strategy with two empty spaces (ex. empty spaces are arranged in phase opposition) for sorbent cells can be first 416 with 526 simultaneously, then 417 with 527 simultaneous, then restart the cycle. For example, the movement strategy with one empty space (e.g., empty space initially at the position of the sorbent cell 201a of FIG. 4) for sorbent cells can be first 527, then 526, then 417, then 416, then restart the cycle.

The method 100 and the system 200 described herein offers solutions to two issues that have been targeted for existing $CO_2$ capture systems using adsorption with thermal regeneration. The first issue to be addressed is the high mechanical energy cost to drive the gas flow to be treated. During the adsorption phase, the gas to be treated must be put in contact with the surface of the adsorbent material, which results in pressure drops. The second issue to be addressed is the high energy consumption for the regeneration phase of the adsorbent material. In some adsorption processes, the regeneration phase requires temperature modulations of the adsorbent material in order to release the captured $CO_2$. These two issues contribute to the overall cost of the $CO_2$ capture process. The method 100 and system 200 described herein assist in reducing the cost of $CO_2$ capture.

To address the pressure drop issue in a capture system, the sorbent cells 201 as described above cycle in an organized structure. The method 100 and the system 200 set out a mainly continuous process with a countercurrent moving bed reactor with adsorption recirculation. For energy efficiency, the use of the separate reactors 210 and 220 in sequence for the adsorption and regeneration process, respectively, creates a distribution of heat in the system. It is also beneficial to use a heat exchanger system, such as the heat exchange zone 230, to further reduce heat loss. Consequently, the method 100 and the system 200 reduce both the pressure losses associated with the internal flow of the gas to be treated and the heat losses associated with the adsorption/regeneration cycles.

In an embodiment, the general concept of the method 100 and the system 200 is to use a continuous adsorption/regeneration process using moving bed reactors, in the form of the sorbent cells 201. The method 100 and the system 200 may operate with countercurrent circulation against adsorption and regeneration streams. The adsorbent material is confined within sorbent cells 201, that are handled like blocks. In an embodiment, the cells 201 are not physically tied to one another.

The adsorption zone 210 may consist of a moving bed adsorption reactor with countercurrent circulation, though concurrent circulation may be used as well in the adsorption reactor 210. The adsorption reactor 210 may be open at both ends to allow gas flow. Some adsorption cells 201 (i.e., two or more) are in series in a conduit of the adsorption zone 210, and may be moved mechanically in the adsorption reactor 210, while a stream of $CO_2$-containing gas flows through the sorption cell 201, for example in the opposite direction. As another possibility, the sorption cells 201 may be displaced by gravity. The $CO_2$ removed from the carrier gas stream is adsorbed on the surface of a sorbent material confined in the sorption cells 201. The sorbent cells 201 increase their $CO_2$ concentration while following the physics of mass transfer (characterized by an adsorption breakthrough curve). When a sorption cell 201 is sufficiently loaded with $CO_2$, it exits the adsorption reactor 210. For example, the sorption cell 201 is displaced sideways from the adsorption reactor 210 through a side port located close to the inlet of the gas stream. This sorbent cell 201 is then conveyed to the regeneration reactor 220. In doing so, the sorbent cell 201 may pass through the heat exchanger zone 230. In order to maintain a continuous process, a freshly regenerated sorption cell 201 is introduced into the adsorption reactor 210 in a back of the line of other sorbent cells 201 present in the reactor 210. This introduced sorbent cell 201 may be introduced laterally into the adsorption reactor 210 through a side port located close to the outlet of the gas stream.

The regeneration zone 220 may be described as a moving bed desorption reactor with countercurrent circulation though concurrent circulation may be used as well in the regeneration reactor 220. The regeneration reactor 220 allows for a thermal swing process, for example, to release the adsorbed $CO_2$ from the sorbent material in the sorbent cells 201. If required, thermal regeneration can be carried out, for example, by circulating a hot fluid to heat the sorbent material. The working fluid used for thermal regeneration can be, as an example, saturated steam. The regeneration reactor 220 may be open at both ends to allow regenerative flow. Some sorption cells 201 (i.e., two or more) are stacked in series to move mechanically, for example, in the regeneration reactor 220, while a stream of regeneration fluid flows through the sorbent cells 201 in the opposite direction for example. As another possibility, the sorption cells 201 may be displaced by gravity. $CO_2$ released from the surface of the sorbent material is consequently unloaded into the regeneration fluid stream. The sorbent cells 201 decrease their $CO_2$ concentration in the regeneration reactor 220 while following the physics of mass transfer (characterized by a desorption breakthrough curve). When an sorbent cell 201 is sufficiently unloaded of $CO_2$, it exits the regeneration reactor 220, for example through a side port located close to the inlet of the regeneration fluid stream. This sorbent cell 220 may then be conveyed to the adsorption reactor 210. This may entail passing the sorbent cell 220 through the heat exchanger zone 230. In order to maintain a continuous process, a highly $CO_2$-loaded sorbent cell 201 is introduced into the regeneration reactor 220 and joins other sorbent cells 201 present in the reactor 220, at an end of a single-file convoy. This introduced sorbent cell 201 may be added laterally into the regeneration reactor 220 through a side port located close to the outlet of the regeneration fluid stream.

In an embodiment, the sorbent cell 201 moving between the adsorption reactor 210 and regeneration reactor 220 may pass through the heat exchanger zone 230. The heat exchanger zone 230 is used to transfer heat from hot sorbent cells 201—moving from the regeneration reactor 220 to the adsorption reactor 210—to other cooler sorbent cells 201—moving from the adsorption reactor 210 to the regeneration reactor 220. In an embodiment, the heat reclaim and heating is done in a single duct, though this is optionally. The sorbent cells 201 going to the adsorption reactor 210 are cooled, while the sorbent cells 201 going to the regeneration reactor are preheated. A cold heat-transfer fluid first passes through the hot sorbent cells, which are then cooled while the heat-transfer fluid is heated. The heated heat transfer fluid subsequently passes through the cold sorbent cells, which are then heated while the heat transfer fluid is cooled.

Referring now to FIG. 10, an implementation of a variant of the method 100 is shown, and features reactor 1050. In the reactor 1050, the same port 1051 is used as inlet and exit for sorbent cell 201. Consequently, the reactor 1050 may be used as adsorption reactor, desorption reactor, or as heat exchanger zone. Inside the reactor 1050, the sorbent cells 201 can move forward or backward. This allows the indexing of the sorbent cell order before or after sorbent cell 201 enters or exits the reactor 1050. In the embodiment of FIG. 10, the sorbent cells 201a enter the reactor 1050 and the sorbent cell 201c exit the reactor 1050, by passing through the same port 1051. For simplicity, FIG. 10 does not show the mechanisms of manipulation and indexing of the sorbent cells 201 through the inlet and outlet ports, and through the reactor 1050, but may be as in the preceding figures, notably via linear actuators.

Figure 11:
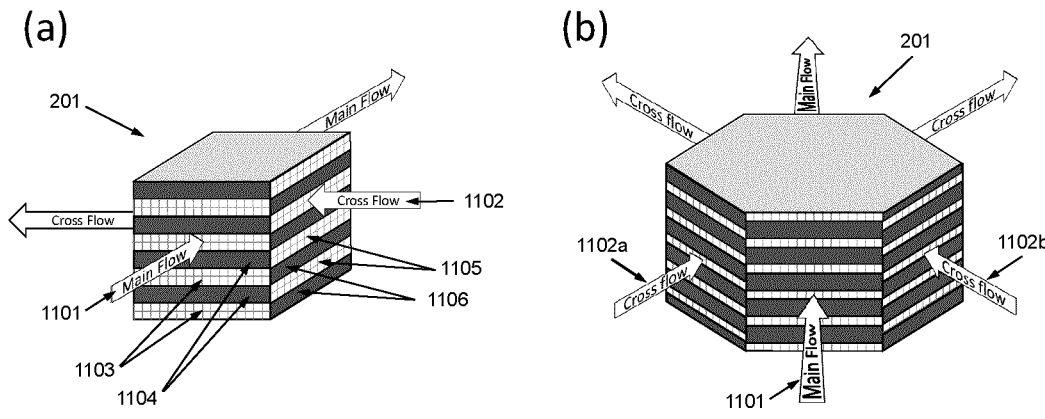
FIG. 11 is a schematic view of an embodiment of a sorbent cell with an internal cross internal flow configuration.

Referring now to FIG. 11, subfigure a), an embodiment of the sorbent cell 201 is shown in which the internal flow may contain a cross flow configuration. The main flow 1101 may pass through the interior of the sorbent cell 201 through the internal channels 1103. A cross flow 1102 may also pass through the interior of the sorbent cell 201 via the internal channels 1105, transverse to the internal channels 1103. The main flow 1101 and the cross flow 1102 may therefore pass through different internal channels (i.e., 1103 and 1105), such that these flows do not mix. The main flow 1101 and cross flow 1102 may be simultaneous, but they may also occur only one at a time. The main flow 1101 may typically be the adsorption flow, or the regenerative flow. The cross flow 1102 may represent a heat transfer flow. The main flow 1101 and cross flow 1102 may be blocked by blocking elements 1104 and 1106 on each side face of the sorbent cell 201. The blocking elements 1104 prevent the main flow 1101 from entering the internal channel 1105 of the cross flow 1102. Similarly, the blocking elements 1106 prevent the cross flow 1102 from entering the internal channel 1103 of the main flow 1101.

Referring now to FIG. 11, subfigure b), another embodiment of the sorbent cell 201 is illustrated, as enabling a plurality of cross flows, such as 1102a and 1102b (e.g., 2 or more). The cross flows 1102a and 1102b can come from the same fluid feed, or from different fluid feeds. In use, the sorbent cells 201 of FIG. 11 may rotate along their perpendicular axis and the flows may be switched. In the rotated position, the main flow 1101 may then pass through the internal channels 1105, and the cross flow 1102 may then pass through the internal channels 1103.

Figure 12:
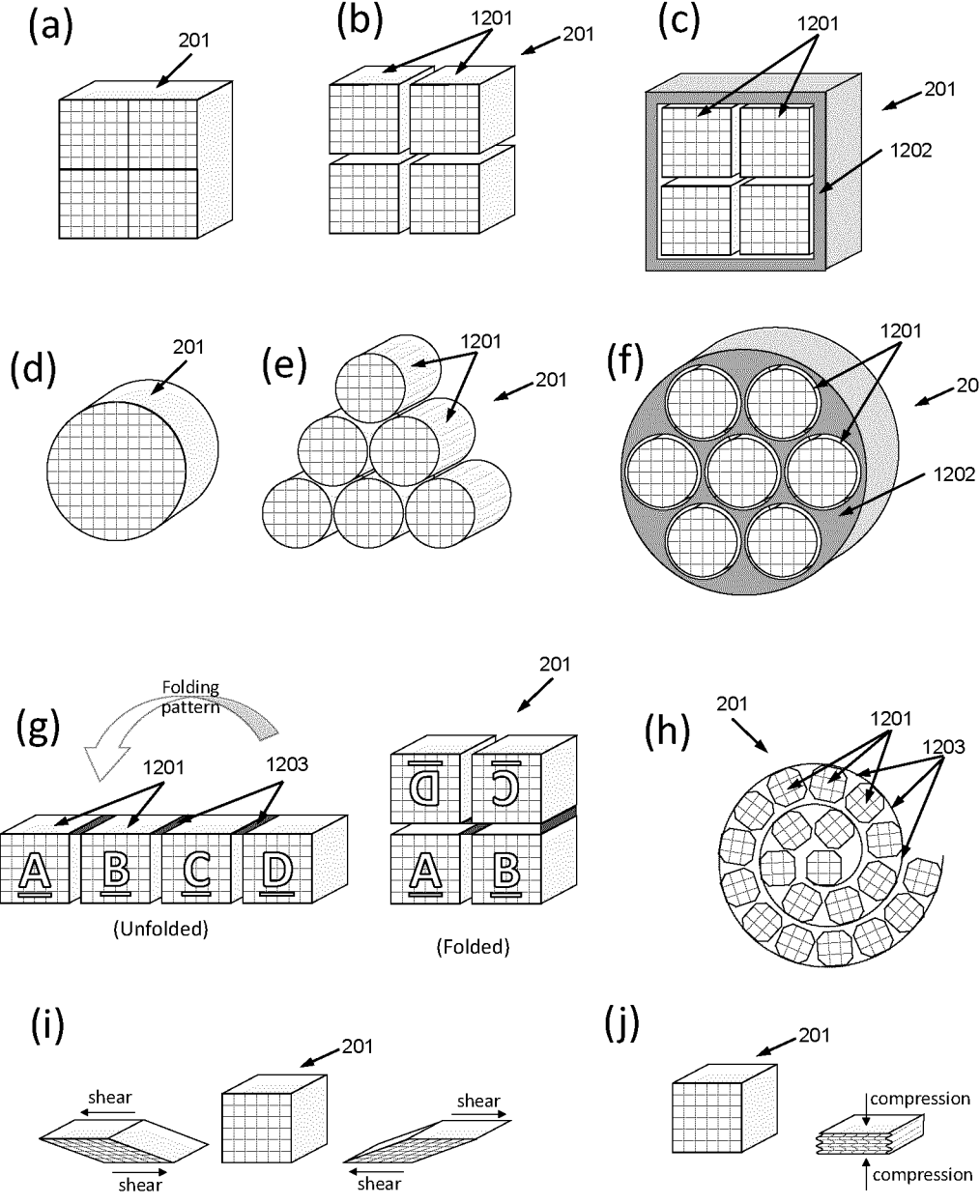
FIG. 12 is a schematic view of many embodiments of sorbent cells composed by a plurality of small sub-sorbent cells.

Referring now to FIG. 12, other variants of sorbent cell 201 are shown. Subfigure a) shows a variant of the sorbent cell 201 constituted by a single element of prismatic shape with a honeycomb-type internal structure, while subfigure d) shows the sorbent cell in a cylindrical shape, with internal channels being transverse to the circular end faces. Subfigures b) and e) show embodiments of a sorbent cell 201 composed of a plurality of smaller sub-sorbent cells 1201. All those sub-sorbent cells 1201 may be arranged together by packaging them together to constitute a main sorbent cell 201. These sub-sorbent cells 1201 may be of different shapes, sizes, internal structures or materials. Subfigures c) and f) show exemplary embodiments of the sorbent cell 201 that consists of a plurality of sub-sorbent cells 1201, all retained by a sorbent cell holder 1202. The sorbent cell holder 1202 may also be used with a single sorbent cell 201.

The embodiments of the sorbent cell holder 1202 of subfigures c) and f) may be closed at each extremity by a door mechanism (not show on the figure), or by add-on panels. By closing the door of the sorbent cell holder 1202, the sorbent cell 201 is isolated from the surrounding conditions. The sorbent cell 201 may then be moved without changing internal $CO_2$ concentration, temperature or pressure.

Still referring to FIG. 12, subfigure g) shows a variant of the sorbent cell 201 composed by a plurality of sub-sorbent cells 1201 all connected to each other (e.g., hinged) by flexible connecting members 1203. The absorbent cell 201 can then be folded and unfolded respecting the degrees of freedom allowed by the connecting elements 1203. The connecting elements 1203, may be of various types, including at least pivot elements, spring elements, flexible joints, connection strips, among other possible shapes. In subfigure h), another embodiment of the sorbent cell 201 may be composed of a plurality of small sub-sorbent cells 1201 all connected together by connecting elements 1203 with a folding pattern that creates a sort of spiral shape. In this embodiment, the connecting elements 1203 may be segmented (e.g., between each sub-sorbent cells 1201), and may also be continuous for the full spiral shape. For simplicity, only the end view of the sorbent cell 201 is shown in subfigure h). In subfigure i), another embodiment of the sorbent cell 201 is shown, the sorbent cell having a volume may be reduced by applying a shear force, i.e., the sorbent cell 201 may be deformed, and even flattened. In subfigure j), another embodiment of a sorbent cell 201 is shown, the sorbent cell 201 having a volume that may be reduced by applying a compression force. In order to allow the deformation, complaint materials may be used for the sorbent cells, or at the junction between structural members. For example, elastomers, thin plastics, plastic foams, thin metallic materials, fiber-based materials, may be used to allow deformation.

Therefore, FIG. 12 shows different configuration of the sorbent cell 201 by which the sorbent cell 201 is deformable. The deformable sorbent cell 201 may then return to an original geometry. The sorbent cell 201 may thus be described as having a body defining internal channels extending between ends, a surface of the internal channels being made of a sorbent material having adsorption capacity. The body having an outer shape, e.g., defined as having the vector of flow normal to a plane of the outer shape, the outer shape of the body being deformable as a response to a shear force and/or a compression force. The sorbent cell 201 may also be described as having two or more subcells, with each said subcell including a body defining internal channels extending between ends, a surface of the internal channels being made of a sorbent material having adsorption capacity. One or more connectors may ne between the at least two subcells, for the at least two subcells to be movable relative to one another.

Figure 13:
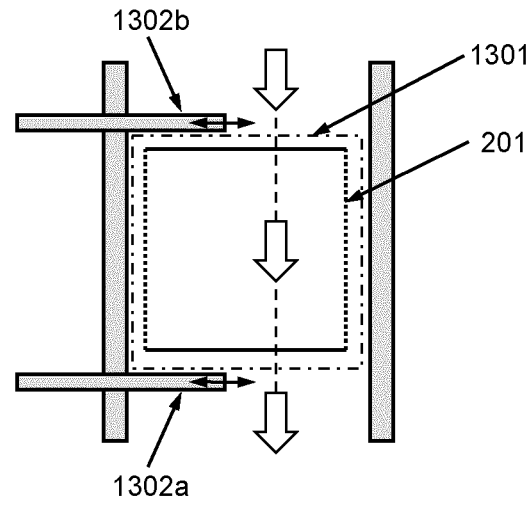
FIG. 13 is a schematic view of an embodiment of an airlock for sorbent cells.

Referring now to FIG. 13, an embodiment of an airlock 1301 containing a sorbent cell 201 is shown, the airlock 1301 usable in the various reactor configurations shown previously. The airlock 1301 may be also be known as a transfer airlock. When the sorbent cell 201 moves between zones (e.g., adsorption reactor zone 210, regenerator reactor zone 220, heat exchanger zone 230), the sorbent cell 201 may pass through the airlock 1301. As an example of an airlock used for the method 100 (FIGS. 1B and 10), the airlock 1301 may be used between the steps 133 and 121, and/or between steps 123 and 134. In such uses, the airlock 1301 may be used to isolate the regeneration reactor 220 from the other zones of the process. As an example, for a regeneration method with a vacuum, the airlock 1301 may be used to control the pressure in its enclosure to reduce pressure fluctuations (e.g., gas entering) when inletting or outletting sorbent cell 201 from the regeneration reactor 220. The airlock 1301 may thus be used to assist in continuously maintaining the vacuum in the regeneration reactor 220. The pressure modulation to which the regeneration reactor 220 is exposed with each addition or subtraction of a cell 201 may hence be limited to a smaller volume (i.e., volume of the enclosure of the airlock 1301), in comparison to the volume of the whole regenerator reactor 220. The airlock 1301 may also be filled with a liquid, then drained, as a heat transfer fluid, to warm up or cool down the sorbent cell 201 before addition or subtraction to the regeneration reactor 220.

Still referring to FIG. 13, the airlock 1301 may be sized to contain one sorbent cell 201, but may also be sized to contain a plurality of the sorbent cell 201. The airlock 1301 is enclosed by at least one airlock door 1302. In FIG. 13, there are two airlock doors 1302 (shown as 1302a and 1302b), one on each side of the airlock 1301. The sorbent cells 201 may enter and leave the airlock 1301 by respective ones of the other airlock doors 1302. As an example, the sorbent cell(s) 201 enters the airlock 1301 via door 1302b, while door 1302a is closed. The doors 1302a and 1302b may then both be closed, at least for an instant. Pressure or temperature may be controlled at such an instant, such as by vacuuming the enclosure of the airlock 1301. The door 1302a may then be opened, with door 1302b closed, for the sorbent cell(s) 201 to exit the airlock 1301 and enter the reactor. A similar sequence may be performed for the sorbent cell 201 to exit the reactor, with the vacuuming/heating/cooling done in the airlock 1301 prior to the sorbent cell(s) 201 entering the airlock 1301 from the reactor, as a possibility.

The airlock door 1302 may be of various types, including at least pivot door, double-leaf door, sliding door, fragmented sliding doors, iris door, flap-up door, rolling door, and many others. The door mechanism 1302 may also include sealing elements all round the opening. For simplicity, FIG. 13 does not show the mechanisms used to manipulate the sorbent cells 201 through the airlock 1301, which mechanisms may be as described for the other embodiments described herein, e.g., linear actuators.

Figure 14:
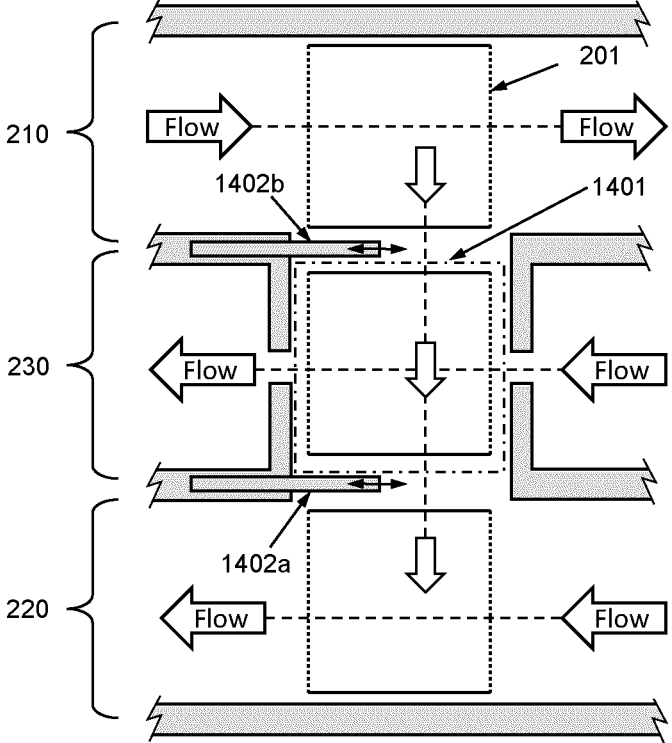
FIG. 14 is a schematic view of an embodiment of an airlock also used as a heat exchanger.

Referring now to FIG. 14, an embodiment of an airlock 1401 also used as a heat exchange zone is shown. For example, a sorbent cell 201 may come from the adsorption zone 210 and enter the airlock 1401 through the airlock door 1402b. The sorbent cell(s) 201 in the airlock 1401 can then be exposed to a modulation of the surrounding conditions (e.g., pressure modulation, temperature modulation, humidity modulation, change of the surrounding fluid type). The sorbent cell(s) 201 may subsequently leave the airlock 1401 through another airlock door 1402a and then move to the regeneration zone 220. The airlock 1401 may be used to isolate the adsorption zone 210 from the regeneration zone 220, while allowing the transfer of sorbent cells 201 between these two zones. The airlock 1401 may also be used as a heat exchanger zone 230. Sorbent cell 201 in airlock 1401 may be exposed to a heat transfer fluid. The airlock 1401 may have ports to allow internal circulation and contribute to the heat exchange. Such ports may increase in size to allow an increase of flow, while reducing in size to preserve the conditions within the airlock 1401 during a transfer between zones. For simplicity, FIG. 14 does not show the mechanisms used to manipulate the sorbent cells 201 through the airlock 1401 and the airlock door mechanisms, which mechanisms may be as described for the other embodiments described herein, e.g., linear actuators.

Figure 15:
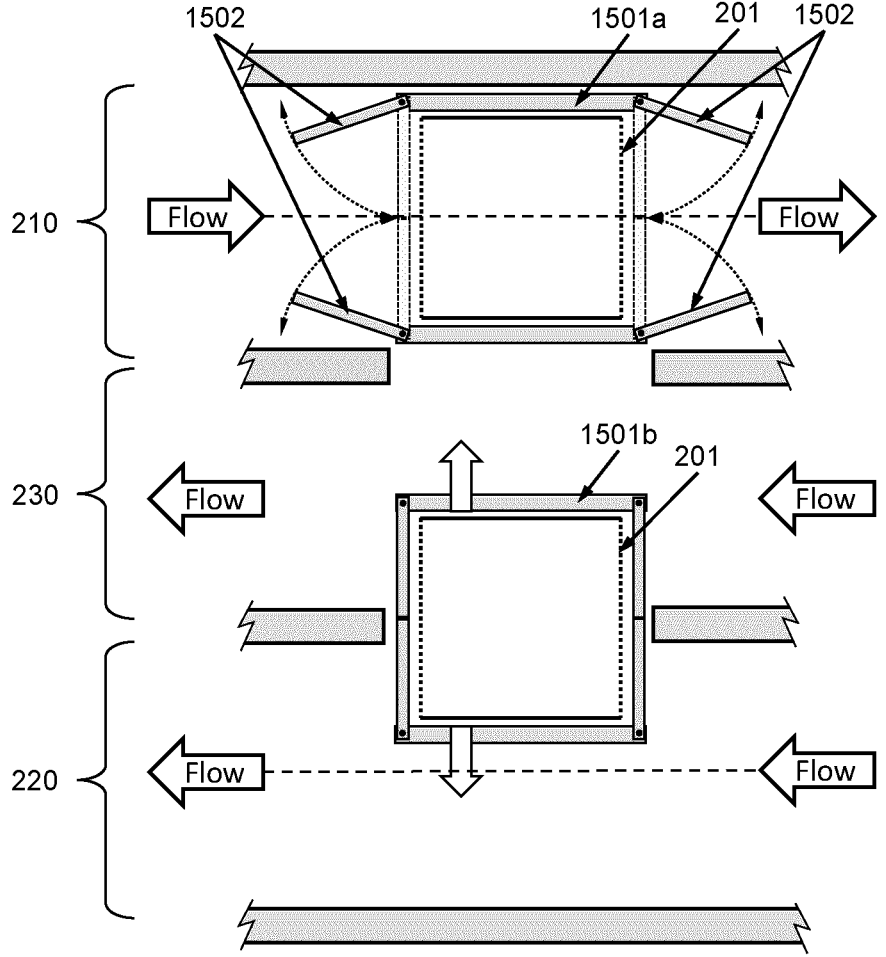
FIG. 15 is a schematic view of an embodiment of an elevator for moving the sorbent cell between different zones.

Referring now to FIG. 15, an embodiment of elevator 1501 for sorbent cell 201 is shown. The elevator 1501 may also be known as a transfer unit, as a transfer enclosure, as a pod, etc, and does not necessarily imply that a vertical movement is present. The elevator 1501 is used to move the sorbent cell 201 from one zone (e.g., adsorption reactor zone 210, regeneration reactor zone 220, heat exchanger zone 230) to any other zone. The elevator may be an analog concept to a mobile airlock. All the functions of an airlock may then be used with an embodiment of an elevator enclosure 1501a. The elevator enclosure 1501a may have one or more doors 1502 (e.g., an open-through enclosure or a diagonal enclosure). Using an open-through enclosure configuration (as shown in FIG. 15), flow (e.g., adsorption flow, regeneration flow) may pass through the elevator enclosure 1501a and through the sorbent cell 201 when the doors 1502 are open. The elevator 1501 is not limited to moving vertically, it can also move horizontally, or follow many other more complex pathways. For simplicity, FIG. 15 does not show the mechanisms used to move the elevator cabin, to move the sorbent cells 201 and the mechanisms of the elevator doors, which mechanisms may be as described for the other embodiments described herein, e.g., linear actuators.

Figure 16:
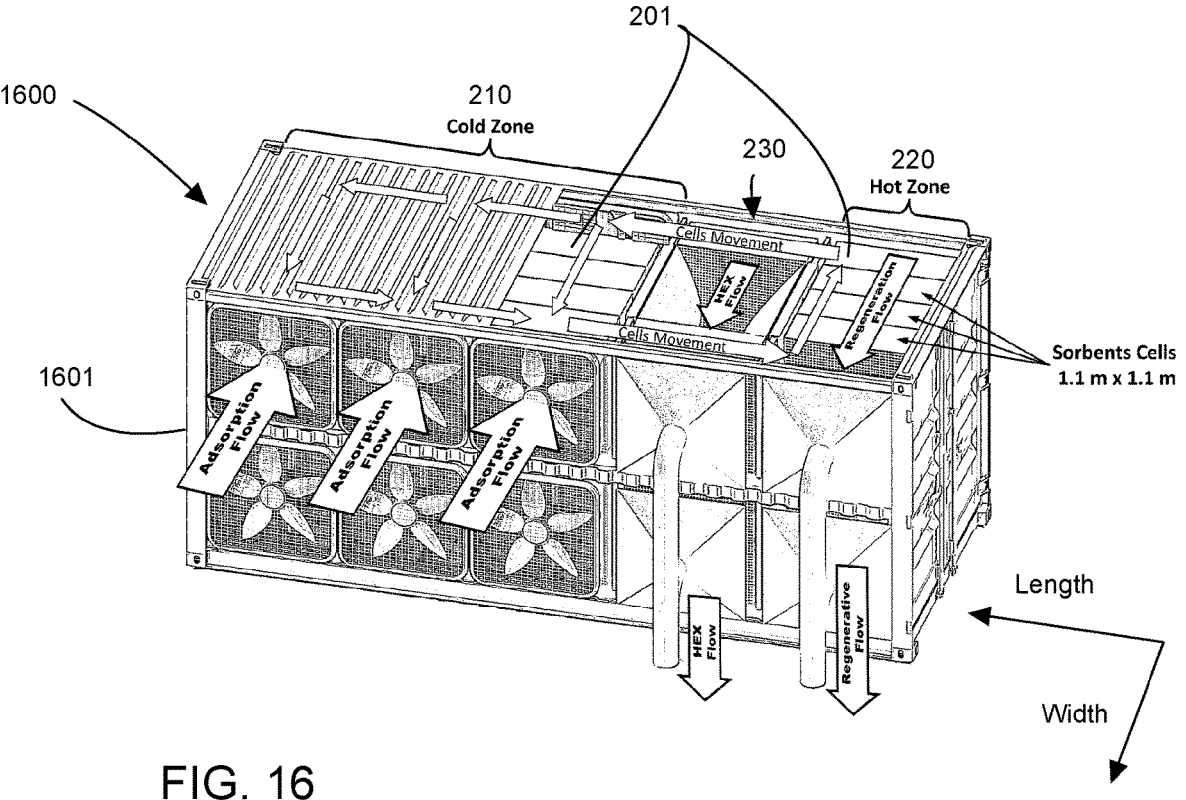
FIG. 16 is a schematic view of an embodiment of a commercial capture unit system of an ISO container size unit.
Figure 17:
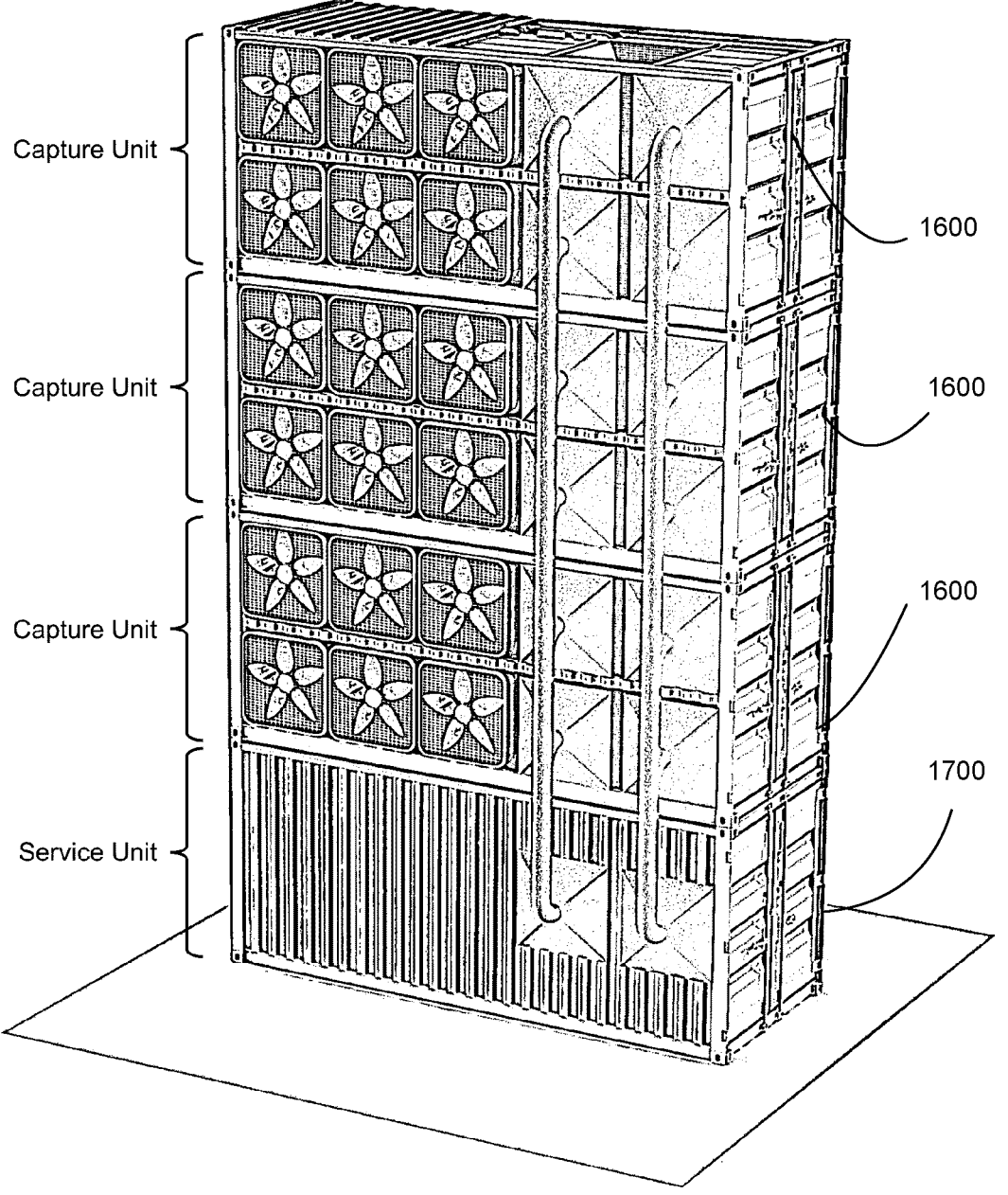
FIG. 17 is a schematic view of an assembly of the commercial capture system of FIG. 16, including a number of modular capture units stacked and interconnected.

Referring now to FIGS. 16 and 17, an embodiment of a commercial capture unit system is shown at 1600. The capture unit system 1600 is of an ISO container size, via container 1601 acting as the structural enclosure for the capture unit system 1600. Thus, by its size, the capture unit system 1600 is well suited for transportation, manipulation, stacking, modular use, etc. Other sizes could also be used for such commercial implementations. A cutaway of a top surface of the container 1601 is provided to show internal components, with adsorption reactors 210 and regeneration reactors 220 being present, as separated by a heat exchanger zone 230.

FIG. 17 shows a contemplated arrangement of the commercial capture system 1600 of FIG. 16, having a number of the commercial capture system 1600 stacked and interconnected, depending on the particulars of customized applications. Three of the capture unit systems 1600 are shown, atop a service unit 1700, also in a container 1601. Other arrangements are contemplated, such as with no stacked service unit 1700, such as with the capture unit system 1600 connecting to fixed service units, to building systems, to separate service units, etc. The service unit 1700 may include power systems, vacuum pumps, reservoirs for fluids, liquids used in the process, etc.

Each capture unit system 1600 is self-contained and incorporates the adsorption reactors 210, regeneration reactors 220, gas moving equipment (fans and vacuum pumps) and heat exchangers. The inputs to the system are a $CO_2$-laden gas, either from the atmosphere or from an industrial process, clean electrical power, low-grade waste heat and air; the outputs are compressed $CO_2$ gas, the treated gas, process air and residual waste heat. In an embodiment, the adsorption reactors 210 are oriented such that the $CO_2$-laden gas circulates in a direction that is transverse to a length of the container 1601 (i.e., via a side wall of the container 1601). Likewise, the regeneration flow may also be in a direction that is transverse to a length of the container 1601, but possibly in a direction opposite that of the adsorption flow. The cells 201 move in a direction generally parallel to the container 1601 when moving between adsorption zone and regeneration zone.

In an example, the container 1601 of each capture unit system 1600 may incorporate six parallel adsorption reactors 210 (e.g., a 3×2 matrix) and two parallel regeneration reactors 220 (e.g., a 1×2 matrix), through other arrangements are possible. A 1×2 heat exchanger matrix may also be present, though optional. The 3×1 row arrangement for the adsorption reactor versus the regeneration reactor exploits a shorter regeneration time as compared to adsorption time. The capture unit systems 1600 may include fans 1602 to circulate ambient air as a possibility (though a closed circuit gas system may also be present). The regeneration flow may be captured by an outlet conduit 1603, that may be shared by the regeneration reactors 220 of the capture unit system 1600 (if two or more are in a single capture unit system 1600), and/or by the regeneration reactors 220 of a stack of the capture unit systems 1600 as in FIG. 17.

Any one of the capture unit systems 1600 may include one or more sorbent cells, such as 36 sorbent cells, each 1.1 m×1.1 m×0.38 m (±10%) with 37 kg of sorbent, for a total of 1.3 metric tonne of sorbent per capture unit system 1600, with, typically at any time, 24 sorbent cells in the adsorption reactors 210, 8 sorbent cells in the regeneration reactors 220 and 4 sorbent cells in the heat exchangers 230. This is merely given as an example. The sorbent cells are square in cross-section, but may have any other configuration, such as those shown in FIG. 12.

Depending on the application, the operating parameters of the system are tailored to optimize the process in terms of cycling speed and time, as a function of initial gas composition, temperature, $CO_2$ concentration and flow rate. The operating parameters for the proposed commercial unit are based on atmospheric (~400 ppm) $CO_2$ capture, a highly demanding application due to the very low $CO_2$ concentration, as compared to $CO_2$-rich industrial flue gas. Specifically, as a non-limitative embodiment, a total atmospheric air input flow rate of 31 $m^3$/s, driven by six 0.85 kW fans, may produce a 5 m/s flow velocity within the sorbent cell channels to ensure laminar flow. Each sorbent cell 201 is moved every 20 minutes over a 2-hour adsorption/regeneration cycle. With a sorbent effective $CO_2$ adsorption capacity of 1.0 mmol/g (i.e., 1.0 mmol of $CO_2$ par grams of sorbent), each capture unit system 1600 may capture 256 $t_{CO2}$/year. Considering regeneration at 70° C./100 mBar, with 40% heat recovery in the heat exchanger and capture from 50% relative humidity air, the system requires an energy input of 250 kWh/$t_{CO2}$ electric and 1015 kWh/$t_{CO2}$ low-grade heat, with a required power input of 7 kW electric (fans+vacuum pump) and 30 kW thermal (desorption of $CO_2$ and $H_2O$+ reactor sensible heat).

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A system for gas adsorbate capture comprising
an adsorption zone configured for receiving an adsorbate gas flow;
a regeneration zone configured for receiving a regenerative fluid flow; and
a plurality of individual sorbent cells in a generally continuous cycle between the adsorption zone and the regeneration zone;

wherein a group of the individual sorbent cells form an adsorption bed in the adsorption zone to capture the adsorbate from the gas flow; and
wherein the individual sorbent cells maintain a constant orientation while moving in the generally continuous cycle between the adsorption zone and the regeneration zone.

2. The system according to claim 1, wherein the individual sorbent cells move between the adsorption zone and the regeneration zone in a first-in-first-out order.

3. The system according to claim 1, wherein a first heat-exchanger zone is between the adsorption zone and the regeneration zone for the sorbent cells moving from the adsorption zone to the regeneration zone to be heated.

4. The system according to claim 3, wherein a second heat-exchanger zone is between the regeneration zone and the adsorption zone for the sorbent cells moving from the regeneration zone to the adsorption zone to be cooled.

5. The system according to claim 4, wherein at least one heat-exchanger system is between the first heat-exchanger zone and the second heat-exchanger zone to heat a fluid flowing through the first heat-exchanger zone and the second heat-exchanger zone.

6. The system according to claim 4, wherein an outlet of the adsorption zone is in fluid communication with the second heat-exchanger zone for fluid to flow from the adsorption zone to the second heat-exchanger zone.

7. The system according to claim 1, wherein the adsorbate gas flow in the adsorption zone is a countercurrent flow.

8. The system according to claim 1, wherein the regenerative fluid flow in the regeneration zone is a countercurrent flow.

9. The system according to claim 1, wherein a liquid reservoir is in the regeneration zone and is configured to receive at least one of the sorbent cells to heat the at least one of the sorbent cells prior to an exposure to the regenerative fluid flow.

10. The system according to claim 1, wherein an airlock is provided at an inlet and/or an outlet of the regeneration zone.

11. The system according to claim 1, wherein an airlock is provided at an inlet and/or an outlet of the adsorption zone.

12. The system according to claim 1, wherein the system is enclosed in an ISO container.

13. The system according to claim 12, wherein the adsorption zone is open to an environment for the adsorbate gas flow to be ambient air.

14. The system according to claim 1, wherein the sorbent cells have internal channels extending between ends, a surface of the internal channels having adsorption capacity.

15. The system according to claim 14, wherein at least one of the sorbent cells has a plurality of sub-sorbent cells interconnected to one another by at least one flexible connecting member.

16. The system according to claim 14, wherein at least one of sorbent cells has a plurality of sub-sorbent cells held by a holder.

17. The system according to claim 14, wherein at least one of the sorbent cells is deformable in shear or in compression.

18. The system according to claim 1, wherein another group of the individual sorbent cells forms a desorption bed in the regeneration reactor to release the adsorbate to the regenerative fluid flow.

19. A method for gas adsorbate capture comprising:

continuously displacing sorbent cells in constant orientation between at least one adsorption zone and at least one regeneration zone in at least one bed in the at least one adsorption zone, exposing a group of the individual sorbent cells in the adsorption zone to an adsorbate gas flow for the individual sorbent cells of the group to capture the adsorbate, and exposing an other group of the individual sorbent cells in the regeneration zone to a regenerative fluid flow for the individual sorbent cells of the other group to release the adsorbate.

20. The system according to claim 1, including at least two of the adsorption zone for a single one of the regeneration zone.

21. The system according to claim 1, wherein the individual sorbent cells move individually between the adsorption zone and the regeneration zone.

22. A system for gas adsorbate capture comprising at least one adsorption zone including an adsorption duct or conduit configured for receiving an adsorbate gas flow; at least one regeneration zone including a regenerative duct or conduit configured for receiving a regenerative fluid flow; a heat-exchanger system in which flows a heat-transfer fluid; and a plurality of individual sorbent cells in a generally continuous cycle between the adsorption zone and the regeneration zone; wherein a group of the individual sorbent cells form an adsorption bed in the adsorption duct or conduit of the adsorption zone to capture the adsorbate from the gas flow; and wherein the heat-exchanger system is used to transfer heat from some of the sorbent cells moving from the at least one regeneration zone to the at least one adsorption zone, to some of the sorbent cells moving from the at least one adsorption zone to the at least one regeneration zone, and wherein the individual sorbent cells maintain a constant orientation while moving in the generally continuous cycle between the at least one adsorption zone and the at least one regeneration zone.

* * * * *